US011506476B2

(12) United States Patent
Lee et al.

(10) Patent No.: US 11,506,476 B2
(45) Date of Patent: Nov. 22, 2022

(54) PORTABLE SURFACE CHARACTERISTICS MEASUREMENT DEVICE AND CONTROL METHOD THEREOF

(71) Applicant: INDUSTRY-UNIVERSITY COOPERATION FOUNDATION HANYANG UNIVERSITY, Seoul (KR)

(72) Inventors: Seung-Beck Lee, Seoul (KR); Onejae Sul, Incheon (KR); Eunsuk Choi, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 435 days.

(21) Appl. No.: 16/885,110

(22) Filed: May 27, 2020

(65) Prior Publication Data

US 2021/0048285 A1    Feb. 18, 2021

(30) Foreign Application Priority Data

Aug. 16, 2019    (KR) .................. 10-2019-0100191

(51) Int. Cl.
*G01B 7/34*    (2006.01)
*G01B 7/02*    (2006.01)
(Continued)

(52) U.S. Cl.
CPC .............. *G01B 7/34* (2013.01); *G01B 7/023* (2013.01); *G01B 17/08* (2013.01); *G01P 7/00* (2013.01)

(58) Field of Classification Search
CPC ........... G01B 7/34; G01B 7/023; G01B 17/08
(Continued)

(56) References Cited

U.S. PATENT DOCUMENTS 6,047,479 A * 4/2000 Galestien ............... G01B 7/284
                                                         33/553
6,696,697 B2 * 2/2004 Enomoto ................. G01B 7/34
                                                        250/559.22
(Continued)

FOREIGN PATENT DOCUMENTS

JP    H07177508 A    7/1995
JP    2000346630 A   12/2000
(Continued)

OTHER PUBLICATIONS

Office Action for Korean Patent Application No. 10-2019-0100191 filed on Aug. 16, 2019 on behalf of Industry University Cooperation Foundation Hanyang. dated Jun. 18, 2020. 9 page, (English+ Original).

*Primary Examiner* — George B Bennett
(74) *Attorney, Agent, or Firm* — Steinfl + Bruno LLP

(57) ABSTRACT

Disclosed are a portable surface characteristics measurement device and a control method thereof. The portable surface characteristics measurement device includes: a roughness sensor configured to convert a signal sensed from a surface of an object during movement of the portable surface characteristics measurement device on the surface of the object into an electric vibration signal; a movement measurement sensor configured to measure a movement physical quantity of the portable surface characteristics measurement device; and a processor configured to change a sampling interval depending on the measured movement physical quantity, and sample the vibration signal in real time, wherein the processor is configured to perform Fourier transform on the sampled vibration signal, and identify a peak frequency band shown in the Fourier-transformed vibration signal as surface roughness information of the object.

20 Claims, 28 Drawing Sheets

(51) Int. Cl.
*G01B 17/08* (2006.01)
*G01P 7/00* (2006.01)

(58) Field of Classification Search
USPC .......................................................... 33/551
See application file for complete search history.

(56) References Cited

U.S. PATENT DOCUMENTS

| | | | |
|---|---|---|---|
| 6,886,394 B1* | 5/2005 | Kume | G01B 7/34 |
| | | | 73/104 |
| 6,901,678 B2* | 6/2005 | Kubota | G01B 7/34 |
| | | | 33/551 |
| 9,285,201 B2* | 3/2016 | Matsumiya | G01B 7/28 |
| 9,976,918 B2* | 5/2018 | Lee | G01L 1/005 |
| 10,190,927 B2 | 1/2019 | Takao | |
| 10,456,050 B2 | 10/2019 | Ko et al. | |
| 11,262,195 B2* | 3/2022 | Jahanbin | G01N 29/4436 |
| 2009/0278798 A1 | 11/2009 | Kim et al. | |
| 2020/0278191 A1* | 9/2020 | Bennett | G01B 7/34 |

FOREIGN PATENT DOCUMENTS

| | | |
|---|---|---|
| KR | 101790558 B1 | 10/2017 |
| WO | 2015/133113 A1 | 9/2015 |

\* cited by examiner

FIG. 17

EXAMPLE OF QUANTITATIVE TACTILE PERCEPTION VALUE SURVEY

| SMOOTH | 1 2 3 4 5 6 7 | ROUGH |
|---|---|---|

EXAMPLE OF QUALITATIVE TEXTURE LEXICON SURVEY

[SENSATION WORD TABLE]

| VERY SMOOTH | SMOOTH | SLIGHTLY SMOOTH | MODERATE | SLIGHTLY ROUGH | ROUGH | VERY ROUGH |
|---|---|---|---|---|---|---|

[EMOTION WORD TABLE]

| FLAT | UNEVEN | PRICKLE | TENDER | LIGHT | HARD AND LUMPY | BUMPY |
|---|---|---|---|---|---|---|
| COARSE | DELICATE | GENTLE | LUXURIOUS | FANCY | CRUDE | COUNTRIFIED |

PORTABLE SURFACE CHARACTERISTICS MEASUREMENT DEVICE AND CONTROL METHOD THEREOF

CROSS-REFERENCE TO RELATED APPLICATION(S)

This application is based on and claims priority under 35 U.S.C. § 119 to Korean Patent Application No. 10-2019-0100191, filed on Aug. 16, 2019, in the Korean Intellectual Property Office, the disclosure of which is incorporated by reference herein in its entirety.

BACKGROUND

Field

Apparatuses and methods consistent with the disclosure relate to a portable surface characteristics measurement device and a control method thereof, and more particularly, to a portable surface characteristics measurement device, which performs measurement to obtain information on a surface of an object regardless of a manner of contacting the surface of the object, and a control method thereof.

Description of the Related Art

There has been a demand for a technology capable of performing measurement on a surface of an object, in a biomedical engineering field requiring a prosthetic hand with a tactile sensing function, a measurement field for sensing a surface characteristics of a object, a skin care and medical field for identifying skin condition, a textile engineering and textile design field for evaluating the texture of a fabric, or the like.

According to the related art, a measurement device performs measurement on a surface of an object while moving at a constant speed in a state in which the measurement device is in contact with the surface of the object. The conventional measurement device outputs, as a quantitative physical quantity, a numerical value caused by the surface roughness of the object by using an electrical or mechanical method. Information on the surface characteristics of the object may be obtained by processing the output quantitative output.

In general, information on the surface characteristics of the object may be detected by analyzing an output signal for the surface of the object in a frequency domain. Therefore, the measurement device needs to maintain a constant contact speed in order to obtain accurate information on the surface characteristics of the object. A motorized stage is required in order for the measurement device to move at a constant speed on the surface of the object. In case that the motorized stage is provided in the measurement device, a volume of the measurement device is inevitably increased, making the measurement device unsuitable as a portable device. In order to implement a portable measurement device, an additional component (for example, a motor or a stage) for maintaining a moving speed of the measurement device needs to be removed.

However, in case that the additional component for maintaining a moving speed of the measurement device is removed, a user needs to move the measurement device, and in this case, it is difficult to maintain the moving speed of the measurement device constant depending on the user. In case that the moving speed of the measurement device is not maintained constant, the periodicity of measured output may not be observed, and thus the obtained information on the characteristic of the surface of the object is also inaccurate, which is problematic.

Therefore, there is a need for a technology in which a portable measurement device without an additional component capable of maintaining a moving speed constant may uniformly perform sensing to obtain information on a surface of an object.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a portable surface characteristics measurement device implemented as a portable device without an additional component (for example, a motor or a stage), and a control method thereof.

Further, the disclosure provides a portable surface characteristics measurement device capable of implementing an improved measurement accuracy on the surface characteristics information of the object, regardless of a variable moving speed of the measurement device.

According to an embodiment of the disclosure, a portable surface characteristics measurement device includes: a roughness sensor configured to convert a signal sensed from a surface of an object during movement of the portable surface characteristics measurement device on the surface of the object into an electric vibration signal; a movement measurement sensor configured to measure a movement physical quantity of the portable surface characteristics measurement device; and a processor configured to change a sampling interval depending on the measured movement physical quantity, and sample the vibration signal in real time, wherein the processor is configured to perform Fourier transform on the sampled vibration signal, and identify a peak frequency band shown in the Fourier-transformed vibration signal as surface roughness information of the object.

The processor may be configured to decrease the sampling interval in case that the movement physical quantity is increased, and increase the sampling interval in case that the movement physical quantity is decreased, to sample the vibration signal at a constant predetermined interval.

The movement physical quantity may be at least one of a distance, a speed, or acceleration.

The processor may be configured to integrate, in case that the movement physical quantity is the acceleration, the measured acceleration, and sample the vibration signal based on the integrated acceleration.

The processor may be configured to transmit, to the roughness sensor, an interrupt signal according to the changed sampling interval based on the measured movement physical quantity, and sample the received vibration signal based on the transmitted interrupt signal.

The portable surface characteristics measurement device may further include a pressure sensor configured to sense a pressure applied to the surface of the object and convert the sensed pressure into an electric pressure signal, wherein the processor is configured to sample the pressure signal at the same interval as the sampling interval of the vibration signal, perform Fourier transform on the sampled pressure signal, perform normalization of the Fourier-transformed vibration signal and the Fourier-transformed pressure signal, eliminate a component of the normalized pressure signal from the normalized vibration signal, and identify a peak frequency band shown in the normalized vibration signal from which the component of the normalized pressure signal is eliminated, as the surface roughness information of the object.

According to another embodiment of the disclosure, a portable surface characteristics measurement device includes: a roughness sensor configured to convert signals sensed from a surface of an object during movement of the portable surface characteristics measurement device on the surface of the object into electric vibration signals; a movement measurement sensor configured to measure a movement physical quantity of the portable surface characteristics measurement device; and a processor configured to change a sampling interval depending on the measured movement physical quantity, and sample some of the vibration signals, wherein the processor is configured to perform Fourier transform on the sampled some vibration signals, and identify peak frequency bands shown in the Fourier-transformed some vibration signals as surface roughness information of the object.

The processor may be configured to decrease the sampling interval in case that the movement physical quantity is increased, and increase the sampling interval in case that the movement physical quantity is decreased, to sample the vibration signal at a constant predetermined interval.

The processor may be configured to insert an estimated sampling vibration signal between two adjacent sampling vibration signals and perform sampling.

The processor may be configured to generate the estimated sampling vibration signal based on a proportional relationship between the two adjacent sampling vibration signals, insert the generated estimated sampling vibration signal between the two adjacent sampling vibration signals, and perform sampling.

The processor may be configured to insert an estimated sampling vibration signal between two adjacent sampling vibration signals based on a proportional relationship between the two adjacent sampling vibration signals.

The portable surface characteristics measurement device may further include a pressure sensor configured to sense pressure applied to the surface of the object and convert the sensed pressure into electric pressure signals, wherein the processor is configured to sample some of the pressure signals at the same interval as the sampling interval of the some vibration signal, perform Fourier transform on the sampled some pressure signals, perform normalization of the Fourier-transformed some vibration signals and the Fourier-transformed some pressure signals, eliminate components of the normalized some pressure signals from the normalized some vibration signals, and identify peak frequency bands shown in the normalized some vibration signals from which the components of the normalized some pressure signals are eliminated, as the surface roughness information of the object.

According to another embodiment of the disclosure, a control method of a portable surface characteristics measurement device includes: converting a signal sensed from a surface of an object during movement of the portable surface characteristics measurement device on the surface of the object into an electric vibration signal; measuring a movement physical quantity of the portable surface characteristics measurement device; changing a sampling interval depending on the measured movement physical quantity, and sampling the vibration signal in real time; performing Fourier transform on the sampled vibration signal; and identifying a peak frequency band shown in the Fourier-transformed vibration signal as surface roughness information of the object.

In the sampling, the sampling interval may be decreased in case that the movement physical quantity is increased, and the sampling interval may be increased in case that the movement physical quantity is decreased, to sample the vibration signal at a constant predetermined interval.

The movement physical quantity may be at least one of a distance, a speed, or acceleration.

In the sampling, in case that the movement physical quantity is the acceleration, the measured acceleration may be integrated, and the vibration signal may be sampled based on the integrated acceleration.

In the sampling, an interrupt signal may be transmitted to a roughness sensor according to the changed sampling interval based on the measured movement physical quantity, and the received vibration signal may be sampled based on the transmitted interrupt signal.

The control method may further include: sensing pressure applied to the surface of the object and converting the sensed pressure into an electric pressure signal; sampling the pressure signal at the same interval as the sampling interval of the vibration signal; and performing Fourier transform on the sampled pressure signal, wherein in the identifying, normalization of the Fourier-transformed vibration signal and the Fourier-transformed pressure signal is performed, a component of the normalized pressure signal is eliminated from the normalized vibration signal, and a peak frequency band shown in the normalized vibration signal from which the component of the normalized pressure signal is eliminated is identified as the surface roughness information of the object.

According to another embodiment of the disclosure, a surface characteristics measurement system includes: a portable surface characteristics measurement device configured to convert a signal sensed from a surface of an object during movement of the portable surface characteristics measurement device on the surface of the object into an electric vibration signal, measure a movement physical quantity of the portable surface characteristics measurement device, change a sampling interval depending on the measured movement physical quantity and sample the vibration signal in real time, perform Fourier transform on the sampled vibration signal, extract surface roughness feature information from the Fourier-transformed vibration signal, and transmit the extracted surface roughness feature information to an external device; and the external device configured to obtain material information of the object, obtain texture lexicon information based on the tactile survey result related to the object, and identify quantitative tactile perception value information based on the transmitted surface roughness feature information and the tactile survey result.

The external device may store the surface roughness feature information, the tactile perception value information, the material information, and the texture lexicon information in association with one another, receive surface roughness feature information of a second object obtained from a surface of the second object through the portable surface characteristics measurement device, and identify tactile perception value information, material information, and texture lexicon information associated with the received surface roughness feature information of the second object.

The external device may output the identified tactile perception value information, material information, and texture lexicon information.

As described above, according to various embodiments of the disclosure, with the portable surface characteristics measurement device and the control method thereof, it is possible to implement a portable measurement device without an additional component for maintaining a moving speed constant.

Further, the portable surface characteristics measurement device and the control method thereof may implement an improved measurement accuracy on the surface characteristics information of an object regardless of a variable moving speed of the measurement device.

Effects of the disclosure are not limited to those described above, and other effects that are not described will be clearly understood by those skilled in the art from the following descriptions.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the disclosure will be more apparent by describing certain embodiments of the disclosure with reference to the accompanying drawings, in which:

FIG. 17 is a diagram for describing an example of a tactile survey form.

DETAILED DESCRIPTION

Figure 1:
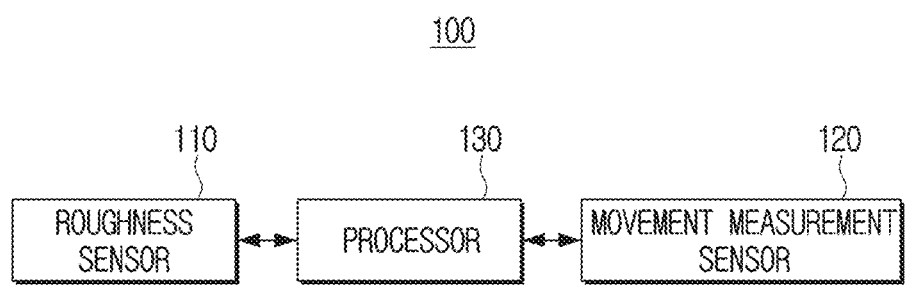
FIG. 1 is a block diagram of a portable surface characteristics measurement device according to an embodiment of the disclosure.

Hereinafter, various embodiments will be described in more detail with reference to the accompanying drawings. Embodiments described in the specification may be variously modified. A specific embodiment may be illustrated in the drawings and be described in detail in a detailed description. However, a specific embodiment illustrated in the accompanying drawings is provided only to allow various embodiments to be easily understood. Therefore, it should be understood that the spirit of the disclosure is not limited by the specific embodiment illustrated in the accompanying drawings, but includes all the modifications, equivalents, and substitutions included in the spirit and the scope of the disclosure.

Further, terms including an ordinal number such as "first" or "second" may be used to describe various components, but the components are not limited by the terms. The terms are only used to differentiate one component from other components.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof. It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

In the specification, a "module'" or a "-er/or" as a used component may perform at least one function or operation. Further, a "module'" or a "-er/or" may perform a function or operation by hardware, software, or a combination of hardware and software. In addition, a plurality of "modules" or a plurality of "-ers/ors" may be integrated in at least one module except for a "module" or a "-er/or" that needs to be implemented by specific hardware or that is implemented by at least one processor. Singular forms used herein are intended to include plural forms unless context explicitly indicates otherwise.

In the description of the disclosure, the order of each step should be understood in a non-limited manner unless a preceding step should be performed logically and temporally before a following step. That is, except for the exceptional cases as described above, even if a process described as a following step is preceded by a process described as a preceding step, it does not affect the nature of the disclosure, and the scope of rights should be defined regardless of the order of the steps. In addition, in the specification, "A or B" is defined not only as selectively referring to either A or B, but also as including both A and B. In addition, in the specification, the term "comprise" has a meaning of further including other components in addition to the components listed.

Only essential components necessary for explanation of the disclosure are described in the specification, and components not related to the essence of the disclosure are not mentioned. The disclosure should not be construed in an exclusive sense that includes only the recited elements, but should be interpreted in a non-exclusive sense to include other elements as well.

However, if it is determined that the detailed description of relevant known functions or components makes may make the gist of the disclosure obscure, the detailed description thereof will be shortened or omitted. Meanwhile, each embodiment may be independently implemented or operated, or the respective embodiments may be implemented or operated in combination.

FIG. 1 is a block diagram of a portable surface characteristics measurement device according to an embodiment of the disclosure.

Referring to FIG. 1, a portable surface characteristics measurement device 100 may include a roughness sensor 110, a movement measurement sensor 120, and a processor 130.

The roughness sensor 110 may come into contact with a surface of an object when the portable surface characteristics measurement device 100 moves (slips) on the surface of the object, and sense a signal based on the surface of the object. Further, the roughness sensor 110 may convert the sensed signal into an electric vibration signal (or vibration information).

A ridge structure (for example, an artificial fingerprint structure) with a predetermined period may be formed on one surface of the roughness sensor 110. As the portable surface characteristics measurement device 100 moves, the roughness sensor 110 included in the portable surface characteristics measurement device 100 may move while being in contact with the surface of the object. In case that the roughness sensor 110 moves while being in contact with the surface of the object, the roughness sensor 110 may sense a vibration signal with respect to time, and output an electric vibration signal. For example, the roughness sensor 110 may be implemented by a vibration sensor, a pressure sensor, a force sensor, an acceleration sensor, or the like. The pressure senor and the pressure sensor signal may be replaced by a contact force sensor and a sensed contact force signal.

The movement measurement sensor 120 may measure a movement physical quantity of the portable surface characteristics measurement device 100. Examples of the movement physical quantity may include a moving distance, a moving speed, and acceleration of the portable surface characteristics measurement device 100. Further, the movement measurement sensor 120 may be implemented by a rangefinder, a speedometer, an accelerometer, or the like.

The processor 130 may change a sampling interval depending on the measured movement physical quantity, and sample a vibration signal in real time. The processor 130 may perform Fourier transform on the sampled vibration signal, and identify surface roughness information of the object based on a peak frequency band shown in the Fourier-transformed signal.

Meanwhile, in case that the measured movement physical quantity is increased, the processor 130 may decrease the sampling interval, and in case that the measured movement physical quantity is decreased, the processor 130 may increase the sampling interval. Therefore, the processor 130 may sample the vibration signal at a constant predetermined interval. For example, in case that a moving distance of the portable surface characteristics measurement device 100 per unit time is increased, the processor 130 may sample a larger amount of data per unit time by decreasing the sampling interval, and in case that a moving distance of the portable surface characteristics measurement device 100 per unit time is decreased, the processor 130 may sample a smaller amount of data per unit time by increasing the sampling interval. The processor 130 may obtain one sampling data every predetermined moving distance of the portable surface characteristics measurement device 100 by sampling the vibration signal in consideration of the moving distance per unit time. That is, the processor 130 may obtain the same number of sampling data for each unit movement physical quantity of the portable surface characteristics measurement device 100 by sampling the vibration signal in consideration of the movement physical quantity. Since the accurate object surface characteristics measurement may be performed only in case that the portable surface characteristics measurement device 100 obtains the same number of sampling data for each unit movement physical quantity, it is important to obtain the same number of sampling data for each unit movement physical quantity.

Meanwhile, the portable surface characteristics measurement device 100 may store a sensed signal with respect to an entire moving time at the time of moving. Further, the portable surface characteristics measurement device 100 may store a movement physical quantity with respect to the entire moving time. For example, the portable surface characteristics measurement device 100 may include a memory (not illustrated) and store, in the memory, a sensed signal and a movement physical quantity with respect to the entire moving time. The processor 130 may calculate moving distance information with respect to time based on the stored movement physical quantity, and convert the calculated moving distance information into time information with respect to a specific distance. The processor 130 may sample some of vibration signals stored in the memory based on the time information with respect to a specific distance obtained by the conversion. Here, the memory may be a storage device separate from the processor 130, or may be an internal storage device provided in the processor 130, such as a buffer. Further, the memory may also be provided in each of the roughness sensor 110 and the movement measurement sensor 120.

The processor 130 may perform Fourier transform on the sampled vibration signal, and identify a peak frequency band shown in the Fourier-transformed vibration signal as surface roughness information of the object. A detailed process in which the portable surface characteristics measurement device 100 identifies the surface roughness information of the object from the sensed signal will be described later.

Figure 2A:
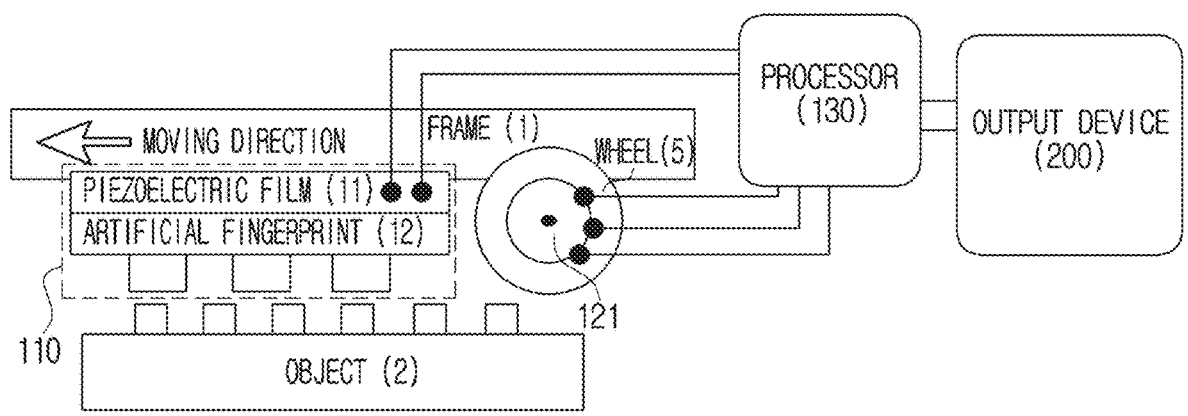
FIG. 2A is a diagram for describing the portable surface characteristics measurement device according to an embodiment of the disclosure.

FIG. 2A is a diagram for describing the portable surface characteristics measurement device according to an embodiment of the disclosure.

Referring to FIG. 2A, the portable surface characteristics measurement device may include the roughness sensor 110 provided on one surface of a frame 1. According to an embodiment, the roughness sensor 110 may include a piezoelectric film 11 and an artificial fingerprint 12. One surface of the artificial fingerprint 12 may have a ridge structure with a predetermined period, and the ridge structure may come into contact with an object 2 to be subjected to surface characteristics measurement. The piezoelectric film 11 may be attached to the other surface of the artificial fingerprint 12. When the portable surface characteristics measurement device moves on the surface of the object 2, the artificial fingerprint 12 is mechanically deformed due to the contact with the object, and the piezoelectric film 11 may convert the mechanical deformation of the artificial fingerprint 12 into an electric vibration signal, and transfer the electric vibration signal obtained by the conversion to the processor 130.

Further, the portable surface characteristics measurement device may include the movement measurement sensor, and the movement measurement sensor may be implemented by a rotary encoder 121. The portable surface characteristics measurement device further includes a wheel 5, and the rotary encoder 121 may be connected to the wheel 5. As the portable surface characteristics measurement device moves on the surface of the object 2, the wheel 5 may rotate. The rotary encoder 121 may measure a rotation angle of the wheel 5, convert the measured rotation angle of the wheel 5 into an electric signal, and transfer the electric signal to the processor 130.

The processor 130 may calculate the movement physical quantity of the portable surface characteristics measurement device, such as a moving distance or a moving speed, in consideration of transferred information on the rotation angle of the wheel 5, a diameter of the wheel 5, or the like. The processor 130 may variably sample a vibration signal based on the calculated movement physical quantity and perform Fourier transform on the sampled data to identify surface roughness information of the object 2.

Meanwhile, the portable surface characteristics measurement device may output the identified information on surface roughness to an output device 200. The identified information on surface roughness may be information on a peak frequency band shown in the Fourier-transformed vibration signal, or may be predefined information matched to the peak frequency band. Examples of the output device 200 may include a display or speaker included in the portable surface characteristics measurement device, or may include a separate display device or speaker positioned outside the portable surface characteristics measurement device.

Figure 2B:
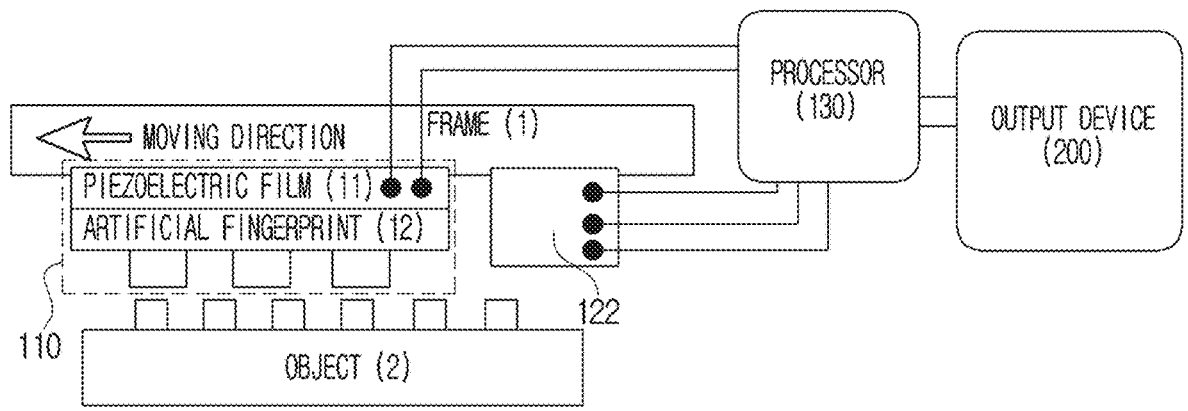
FIG. 2B is a diagram for describing a portable surface characteristics measurement device according to another embodiment of the disclosure.

FIG. 2B is a diagram for describing a portable surface characteristics measurement device according to another embodiment of the disclosure.

Referring to FIG. 2B, the portable surface characteristics measurement device may include a roughness sensor 110 disposed on one surface of the frame 1, a movement measurement sensor 120, and a processor 130. The roughness sensor 110 and the processor 130 are the same as those described in FIG. 2A, and thus a detailed description thereof will be omitted. The movement measurement sensor may be implemented by an accelerometer 122. In case that the movement measurement sensor is implemented by the accelerometer 122, the processor 130 may integrate a signal measured by the accelerometer 122 to convert the signal into a speed. Further, the movement measurement sensor may sample a vibration signal based on the speed obtained by the conversion. Alternatively, the portable surface characteristics measurement device may calculate a moving distance based on speed information and time information, and sample a vibration signal based on the calculated moving distance.

Meanwhile, the portable surface characteristics measurement device may sample a vibration signal for a unit moving distance, and process the sampled data. The processor 130 may identify the movement physical quantity of the portable surface characteristics measurement device based on an output signal of the rotary encoder 121 or the accelerometer 122, and may sample a vibration signal each time the portable surface characteristics measurement device moves by the unit moving distance. In case that the portable surface characteristics measurement device samples a vibration signal for the unit moving distance, since the sampled vibration signal is a vibration signal for the unit moving distance, it is not necessary to use interpolation. Therefore, the portable surface characteristics measurement device may perform Fourier transform on the sampled vibration signal to obtain information on 1/surface period.

Meanwhile, the processor 130 may transmit, to the roughness sensor 110, an interrupt signal according to the sampling interval based on the measured movement physical quantity. Further, the roughness sensor 110 may transfer the vibration signal to the processor 130 based on the transmitted interrupt signal. With the above-described process, the processor 130 may sample the vibration signal for the unit moving distance. Although one processor 130 is illustrated in FIGS. 2A and 2B, the portable surface characteristics measurement device may also include a plurality of processors dividedly perform processes such as the generation of the interrupt signal, the sampling of the vibration signal, and the calculation of the movement physical quantity.

Although FIGS. 2A and 2B illustrate examples in which the roughness sensor 110 includes the piezoelectric film 11, the roughness sensor 110 may also be implemented by a pressure sensor, an acceleration sensor, or the like. In addition, although an example in which the portable surface characteristics measurement device includes the artificial fingerprint 12 has been described, the portable surface characteristics measurement device does not have to include the artificial fingerprint 12, and may have one surface with a form other than an array form. Alternatively, the roughness sensor 110 may be implemented as a pen type, rather than a plane type.

Further, although FIGS. 2A and 2B illustrate an example in which the movement measurement sensor is the rotary encoder 121 or the accelerometer 122, the movement measurement sensor may be implemented by a slide type displacement sensor (for example, a slide potentiometer), or a displacement sensor used in an optical mouse. Further, the movement measurement sensor may be implemented by any sensor capable of measuring or indirectly calculating a distance or speed of the portable surface characteristics measurement device.

Figure 3A:
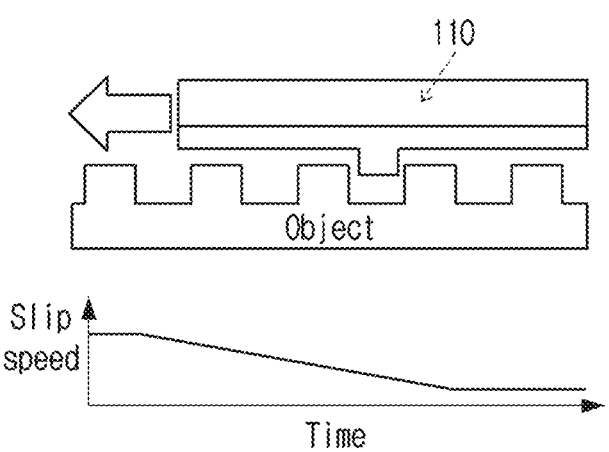
FIG. 3A is a diagram for describing the portable surface characteristics measurement device moving on a surface of an object.

FIG. 3A is a diagram for describing the portable surface characteristics measurement device moving on a surface of an object.

For example, in case that the roughness sensor (or the portable surface characteristics measurement device) moves on an object having a repetitive rugged structure with one type of period at a constant speed while being in contact with a surface of the object, the roughness sensor may sense a vibration signal with respect to time. As the surface period of the object and a rugged structure of the roughness sensor periodically come into contact with each other, the sensed signal of the roughness sensor may be output as a voltage signal that periodically changes in a time domain. In case that the output voltage signal in the time domain is Fourier-transformed, two peaks corresponding to a period of the rigid structure of the roughness sensor and the surface period of the object may be shown in the Fourier-transformed signal ($\lambda=v/f$). $\lambda$ is the surface period, v is a moving speed of the portable surface characteristics measurement device (or the roughness sensor), and f is a peak frequency by the object. The portable surface characteristics measurement device may identify a detected peak frequency band as surface roughness information of the object.

However, in case that a user moves the portable surface characteristics measurement device on the surface of the object, the moving speed (slip speed) may vary with respect to time as illustrated in FIG. 3A. Alternatively, the moving speed of the portable surface characteristics measurement device may vary depending on a user.

Figure 3B:
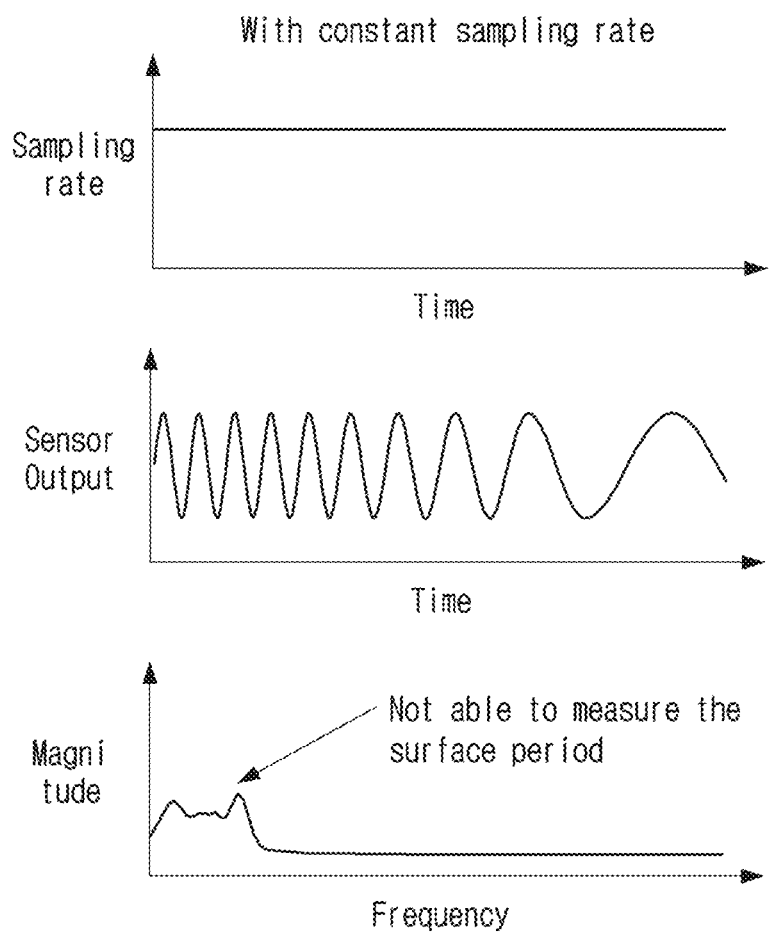
FIG. 3B is a diagram for describing an example in which a vibration signal is sampled at a constant interval.

FIG. 3B is a diagram for describing an example in which a vibration signal is sampled at a constant interval.

In case that a vibration signal is sampled at a constant interval when the portable surface characteristics measurement device moves at a variable speed, the portable surface characteristics measurement device may sense the vibration signal with a narrow width in a section where the speed of the portable surface characteristics measurement device is high, and sense the vibration signal with a wide width in a section where the speed of the portable surface characteristics measurement device is low, as illustrated in FIG. 3B.

In case that the moving speed of the portable surface characteristics measurement device varies even when the surface period of the contact object is constant, the peak frequency band may not be specified when the portable surface characteristics measurement device performs Fourier transform on the sensed vibration signal. Therefore, the surface of the object that has the repetitive rugged structure with only one type of period may be identified as having combination of various periodic structures. That is, in case that the vibration signal is sampled at a constant interval in a situation where constant-speed movement of the portable surface characteristics measurement device is not guaranteed, surface roughness information of the object may be distorted, which is problematic.

Figure 3C:
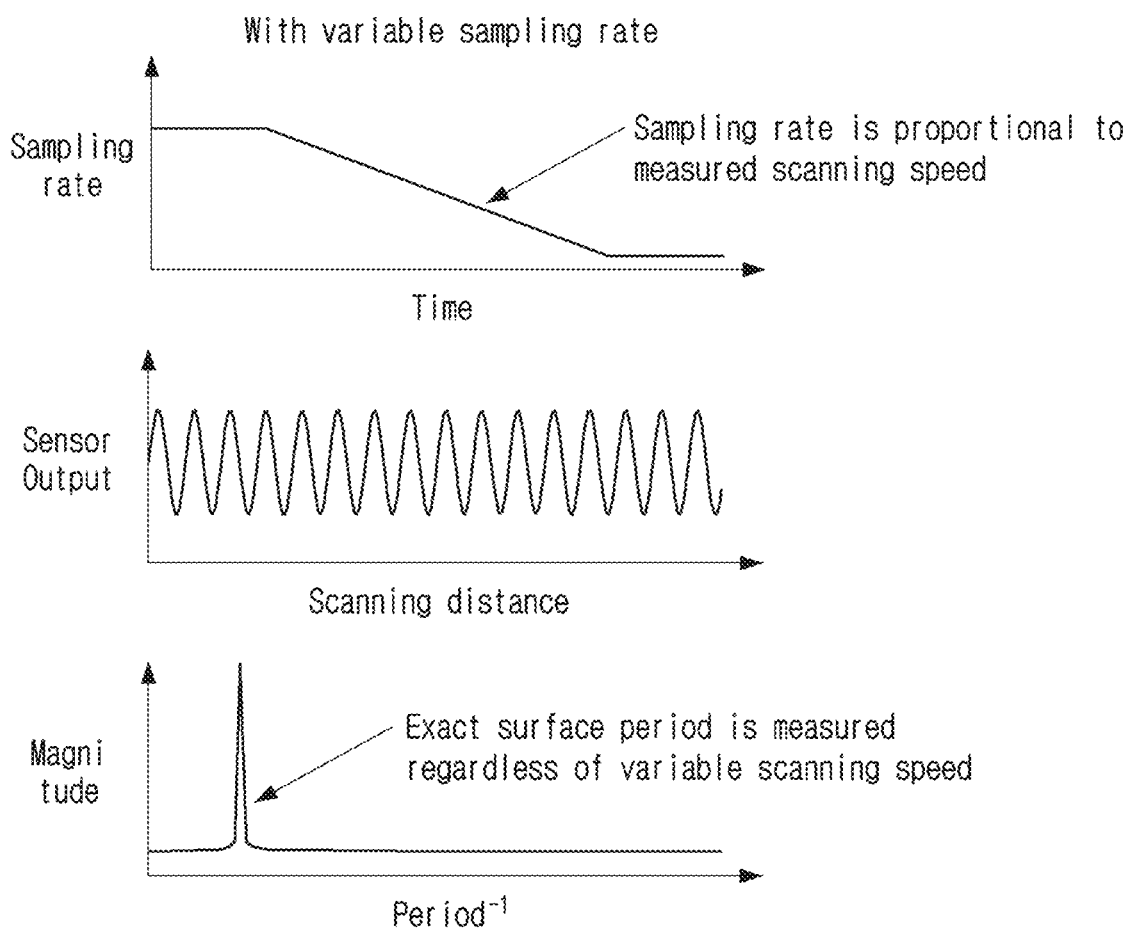
FIG. 3C is a diagram for describing an example in which a vibration signal is sampled at a variable interval.

FIG. 3C is a diagram for describing an example in which a vibration signal is sampled at a variable interval.

As described above, the portable surface characteristics measurement device may not include a component for maintaining the moving speed constant. Therefore, the moving speed of the portable surface characteristics measurement device may vary depending on a user. The portable surface characteristics measurement device according to the disclosure may include the movement measurement sensor to measure the movement physical quantity of the portable surface characteristics measurement device. Further, the processor may change the sampling interval based on the measured movement physical quantity. That is, the portable surface characteristics measurement device may decrease the sampling interval in case that the speed is high, and may increase the sampling interval in case that the speed is low. The sampling interval may be inversely proportional to the speed of the portable surface characteristics measurement device based on a specific constant. Therefore, although the portable surface characteristics measurement device may sense a vibration signal at an inconstant time interval, the portable surface characteristics measurement device may sense a vibration signal at a constant moving distance interval. That is, a distance interval 1 is v*t (1=v*t), and the same effect as that when the portable surface characteristics measurement device samples the vibration signal while moving at a constant speed may be obtained by adjusting a time interval t (adjusting sampling interval) depending on an increase or decrease in speed v. That is, as illustrated in FIG. 3C, the portable surface characteristics measurement device may identify accurate information on ruggedness (or roughness) of the surface of the object by performing Fourier transform on a vibration signal sampled according to a variable sampling method.

As described above, the movement measurement sensor may be implemented by a distance measuring sensor, a position sensor, a speedometer, an accelerometer, or the like, and measure a movement physical quantity such as a speed or acceleration, and the portable surface characteristics measurement device may perform a variable sampling process based on the measured movement physical quantity.

The variable sampling process may be performed in real time. The portable surface characteristics measurement device including the roughness sensor moves along the surface of the object. The movement measurement sensor may measure the movement physical quantity. As described above, examples of the movement measurement sensor may include a distance measuring sensor, a position sensor, a speedometer, and an accelerometer, and examples of the movement physical quantity may include a distance, a speed, and acceleration. The processor may sample a vibration signal of the roughness sensor each time the portable surface characteristics measurement device moves by a predetermined distance. According to an embodiment, a method for measuring a moving distance of the portable surface characteristics measurement device may include a method of directly measuring the moving distance or a method of indirectly calculating the moving distance by performing integration based on a measured speed or acceleration.

Alternatively, the variable sampling process may be performed after obtaining vibration signals which are sampled in entire measurement time.

When the portable surface characteristics measurement device moves, the portable surface characteristics measurement device may sample the vibration signal at a predetermined time interval, and store the sampled vibration signal. In addition, the portable surface characteristics measurement device may store the movement physical quantity. The portable surface characteristics measurement device may calculate the moving distance based on the stored movement physical quantity. As described above, the calculation of the moving distance may be performed by directly measuring the moving distance or by indirectly calculating the moving distance by performing integration based on a measured speed or acceleration.

The portable surface characteristics measurement device may convert the moving distance information with respect to time into the time information with respect to a specific distance. That is, such a process may be the same as a process in which the portable surface characteristics measurement device converts a variable speed into a specific virtual reference speed by converting a time with respect to the stored unit moving distance into a new time axis with equal intervals, and a vibration signal is re-sampled on a new virtual time axis with equal intervals based on the reference speed obtained by the conversion. The portable surface characteristics measurement device may identify surface roughness information of the object by analyzing the vibration signal in a frequency domain based on the vibration signal sampled based on the specific virtual reference speed.

Meanwhile, in case that the vibration signal is re-sampled on the new virtual time axis with equal intervals based on the vibration signal sampled at a constant time interval, there may be no measurement data on a specific unit distance. Therefore, the portable surface characteristics measurement device may generate estimated data for time information or vibration signal information by using interpolation. A process of generating the estimated data using the interpolation will be described later.

Figure 4:
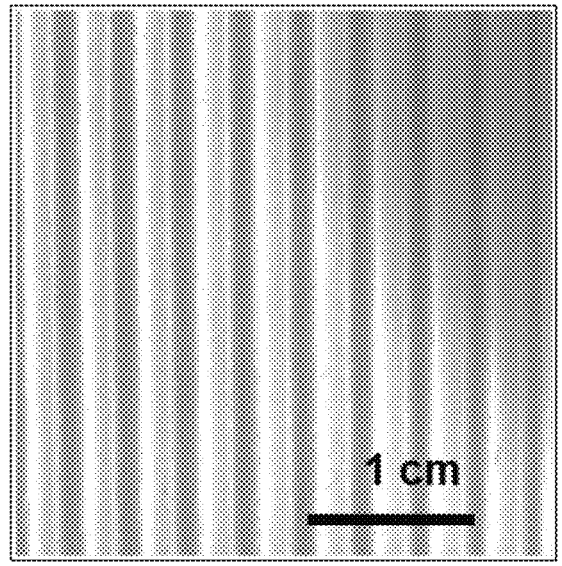
FIG. 4 is a microphotograph of a contact object with a surface period of 3.3 mm, the contact object being subjected to roughness sensing using the portable surface characteristics measurement device according to an embodiment of the disclosure.

FIG. 4 is an optic image of an object with a surface period of 3.3 mm. Specifically, the optic image is a photograph obtained by magnifying and capturing a specific region of a corrugated cardboard by using a microscope.

Figure 5A:
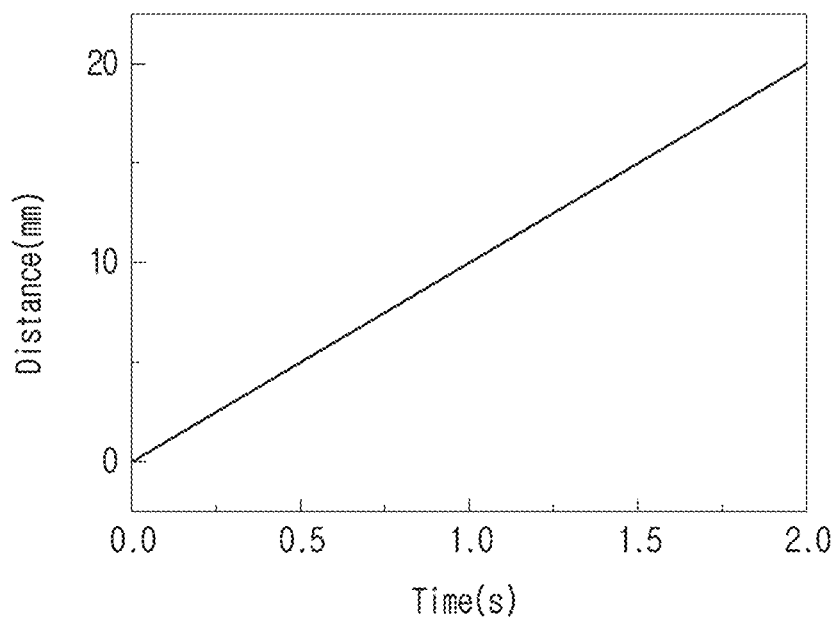
FIG. 5A is a diagram for describing a relationship between a time and a moving distance in case that the portable surface characteristics measurement device moves on the surface of the object at a constant speed.
Figure 5B:
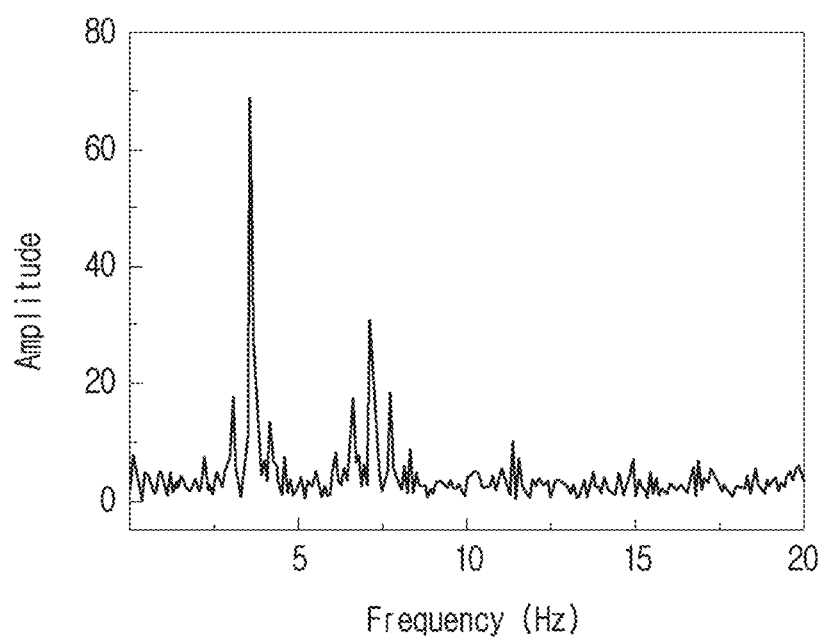
FIG. 5B is a diagram for describing a result of performing Fourier transform on a signal of a roughness sensor sensed in case that the portable surface characteristics measurement device moves on the surface of the object at a constant speed.
Figure 5C:
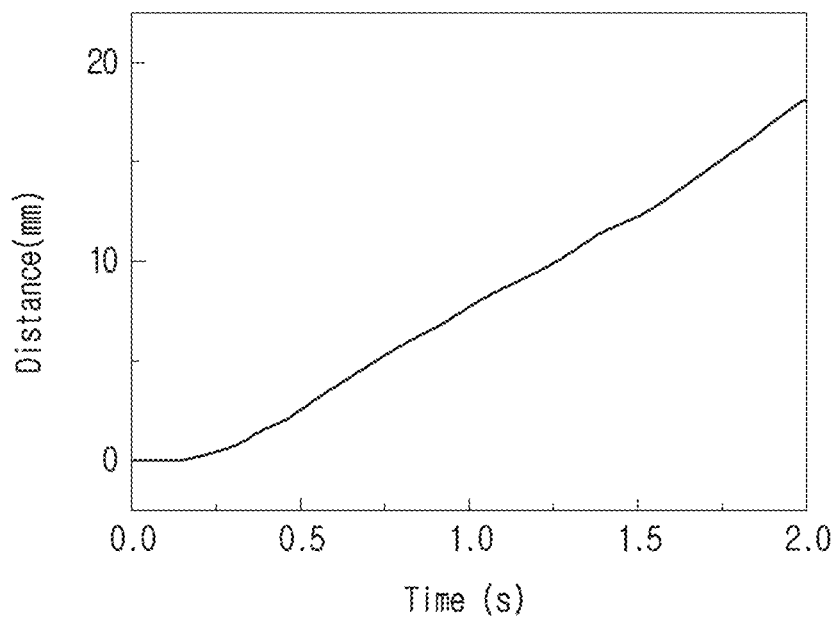
FIG. 5C is a diagram for describing a relationship between a time and a moving distance in case that the portable surface characteristics measurement device according to an embodiment of the disclosure moves at a variable speed.
Figure 5D:
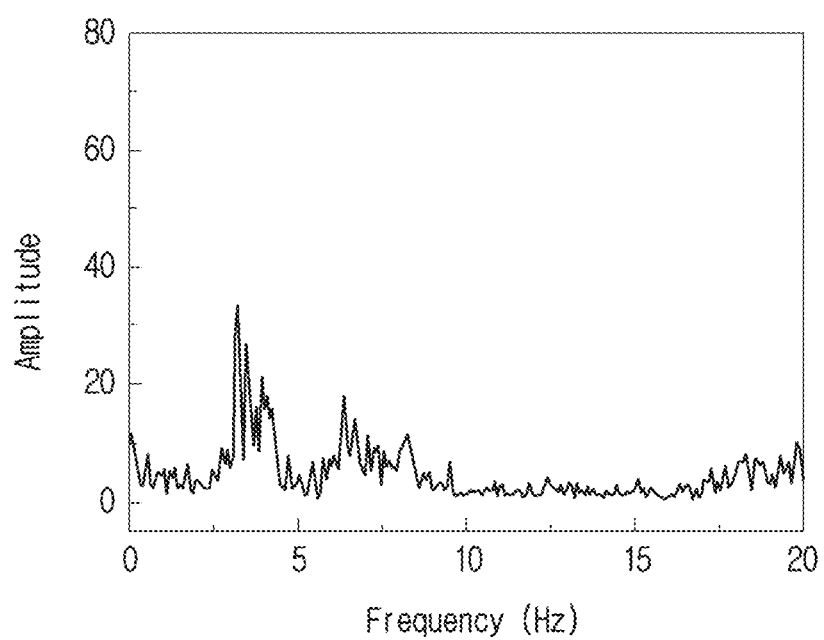
FIG. 5D is a diagram for describing a result of performing Fourier transform on a signal of the roughness sensor to which a variable sampling method is not applied in case that the portable surface characteristics measurement device moves at a variable speed.
Figure 5E:
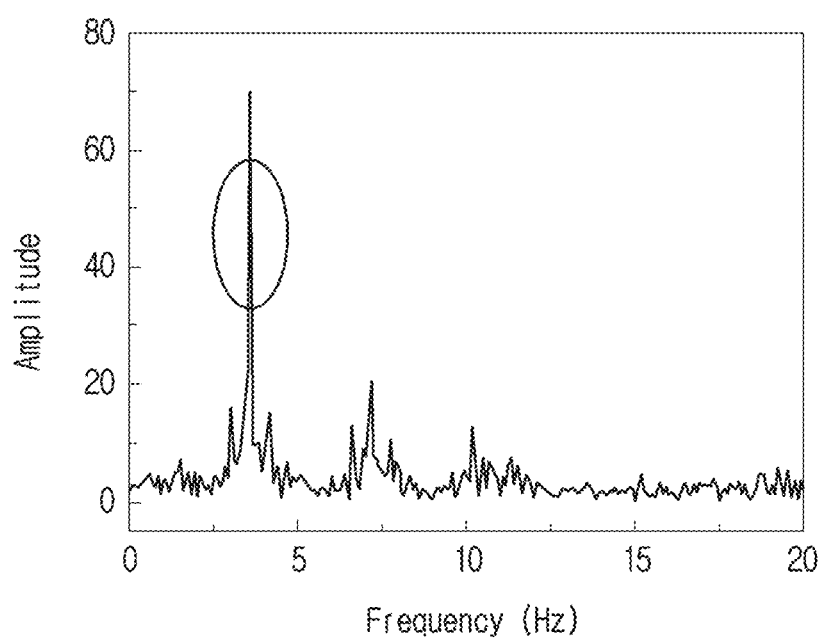
FIG. 5E is a diagram for describing a result of performing Fourier transform on a signal of the roughness sensor to which the variable sampling method is applied in case that the portable surface characteristics measurement device according to an embodiment of the disclosure moves at a variable speed.

FIG. 5A is a diagram for describing a relationship between a time and a moving distance in case that the portable surface characteristics measurement device moves on the surface of the object at a constant speed (for example, 10 mm/s), FIG. 5B is a diagram for describing a result of performing Fourier transform on a signal of the roughness sensor in case that the portable surface characteristics measurement device moves on the surface of the object at a constant speed, FIG. 5C is a diagram for describing a relationship between a time and a moving distance in case that the portable surface characteristics measurement device according to an embodiment of the disclosure moves at a variable speed, FIG. 5D is a diagram for describing a result of performing Fourier transform on a signal of the roughness sensor to which the variable sampling method is not applied in case that the portable surface characteristics measurement device moves at a variable speed, and FIG. 5E is a diagram for describing a result of performing Fourier transform on a sensed signal to which the variable sampling method is applied in case that the portable surface characteristics measurement device according to an embodiment of the disclosure moves at a variable speed.

FIG. 5A illustrates a moving distance-time graph when the surface characteristics measurement device moves on the surface of the object at a constant speed (for example, 10 mm/s) by using a motorized stage. The moving distance-time graph may have a constant slope because the surface characteristics measurement device moves at a constant speed by using the motorized stage. FIG. 5B illustrates a result of performing Fourier transform on a signal of the roughness sensor. It may be appreciated that a peak frequency band is shown at 3.3 Hz corresponding to a surface period of 3.3 mm of the contact object (that is, the corrugated cardboard) and a contact speed of 10 mm/s.

FIG. 5C illustrates a moving distance-time graph when the surface characteristics measurement device is moved on the surface of the object by the user. In FIG. 5C, it may be appreciated that the surface characteristics measurement device moves at a variable speed with respect to time. FIG. 5D illustrates a result of performing Fourier transform on a signal of the roughness sensor without applying the variable sampling method. Unlike FIG. 5B, a peak frequency band is widened and a peak corresponding to the surface period of the contact object is not shown. FIG. 5E illustrates a result of performing Fourier transform on a signal of the roughness sensor by applying the variable sampling method. It may be appreciated that a peak frequency band similar to that of FIG. 5B is shown.

Meanwhile, the portable surface characteristics measurement device may further include a pressure sensor.

Figure 6:
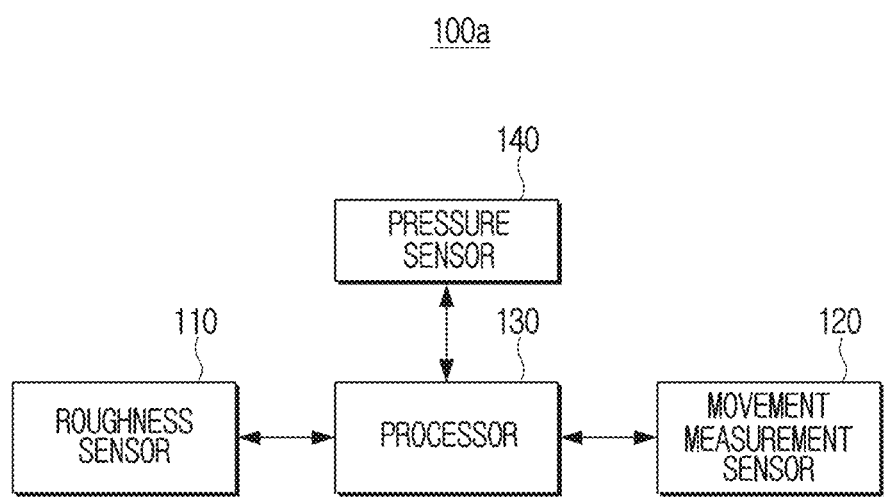
FIG. 6 is a block diagram of a portable surface characteristics measurement device according to another embodiment of the disclosure.

FIG. 6 is a block diagram of a portable surface characteristics measurement device according to another embodiment of the disclosure.

Referring to FIG. 6, a portable surface characteristics measurement device 100a may include a roughness sensor 110, a movement measurement sensor 120, a processor 130, and a pressure sensor 140. The roughness sensor 110, the movement measurement sensor 120, and the processor 130 are the same as those described in FIG. 1, and thus a detailed description thereof will be omitted.

The pressure sensor 140 may sense pressure applied to a surface of an object when the portable surface characteristics measurement device 100a moves on the surface of the object, and convert the sensed pressure into an electric pressure signal. Pressure applied to the object when the portable surface characteristics measurement device 100a is moved on the surface of the object by the user may vary. Since a vibration signal of the portable surface characteristics measurement device 100a may include a varying pressure signal component, it may be difficult to obtain accurate surface roughness information of the object. Therefore, the portable surface characteristics measurement device 100a may include the pressure sensor 140 and identify the surface roughness information of the object based on information on the pressure measured by the pressure sensor 140.

Figure 7A:
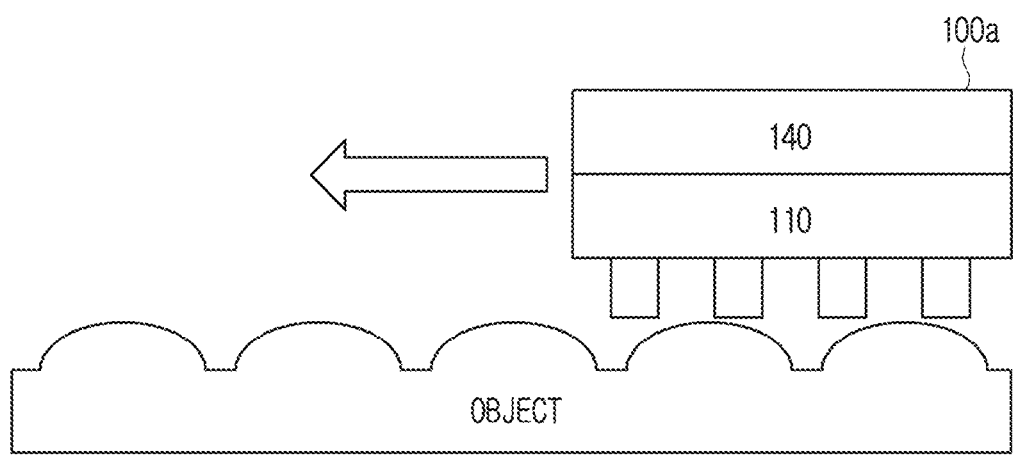
FIG. 7A is a diagram for describing a case that the portable surface characteristics measurement device moves on the surface of the object.
Figure 7B:
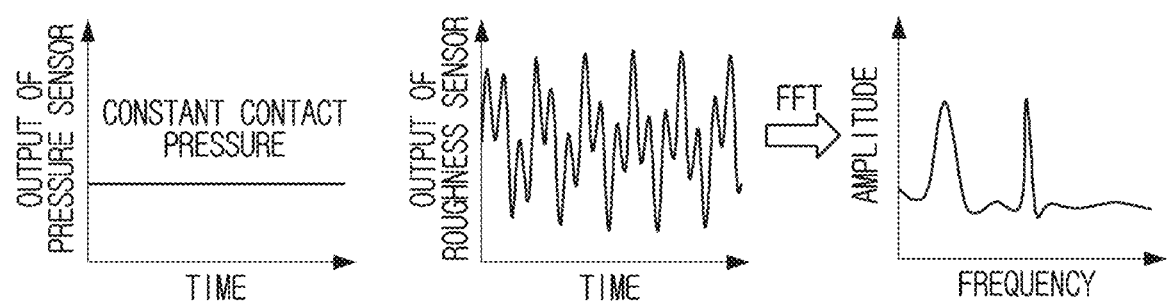
FIG. 7B is a diagram for describing a signal sensed in case that the portable surface characteristics measurement device moves on the surface of the object with a constant pressure.

FIG. 7A is a diagram for describing a case that the portable surface characteristics measurement device moves on the surface of the object, and FIG. 7B is a diagram for describing a signal sensed in case that the portable surface characteristics measurement device moves on the surface of the object with a constant pressure. Referring to FIGS. 7A and 7B, a case that the portable surface characteristics measurement device moves on the surface of the object with a constant pressure will be described.

According to an embodiment, the roughness sensor 110 may generate a vibration signal based on ruggedness (or roughness) of the object while moving in a state of being in contact with the surface of the object. The pressure sensor 140 may be disposed on the roughness sensor 110 and generate a pressure signal for pressure applied to the surface of the object by the portable surface characteristics measurement device.

In case that the portable surface characteristics measurement includes a component enabling movement at a constant speed with a constant pressure, the pressure signal output from the pressure sensor 140 may have a constant value as illustrated in FIG. 7B. Further, as described above, the roughness sensor 110 may also output a vibration signal corresponding to the ruggedness of the surface of the object.

The pressure signal output from the pressure sensor 140 may be Fourier-transformed. In case that the pressure signal having a constant value is Fourier-transformed, as the Fourier-transformed pressure signal, only a certain signal in a low frequency region appears. Therefore, it may be possible to identify the surface roughness information of the object only with the vibration signal of the roughness sensor 110 without considering the pressure signal. However, in case that the portable surface characteristics measurement device 100*a* is moved by the user, a contact pressure applied to the surface of the object is not constant. Therefore, it is preferable that a pressure component is considered in order for the portable surface characteristics measurement device to identify accurate information on the surface of the object.

Figure 7C:
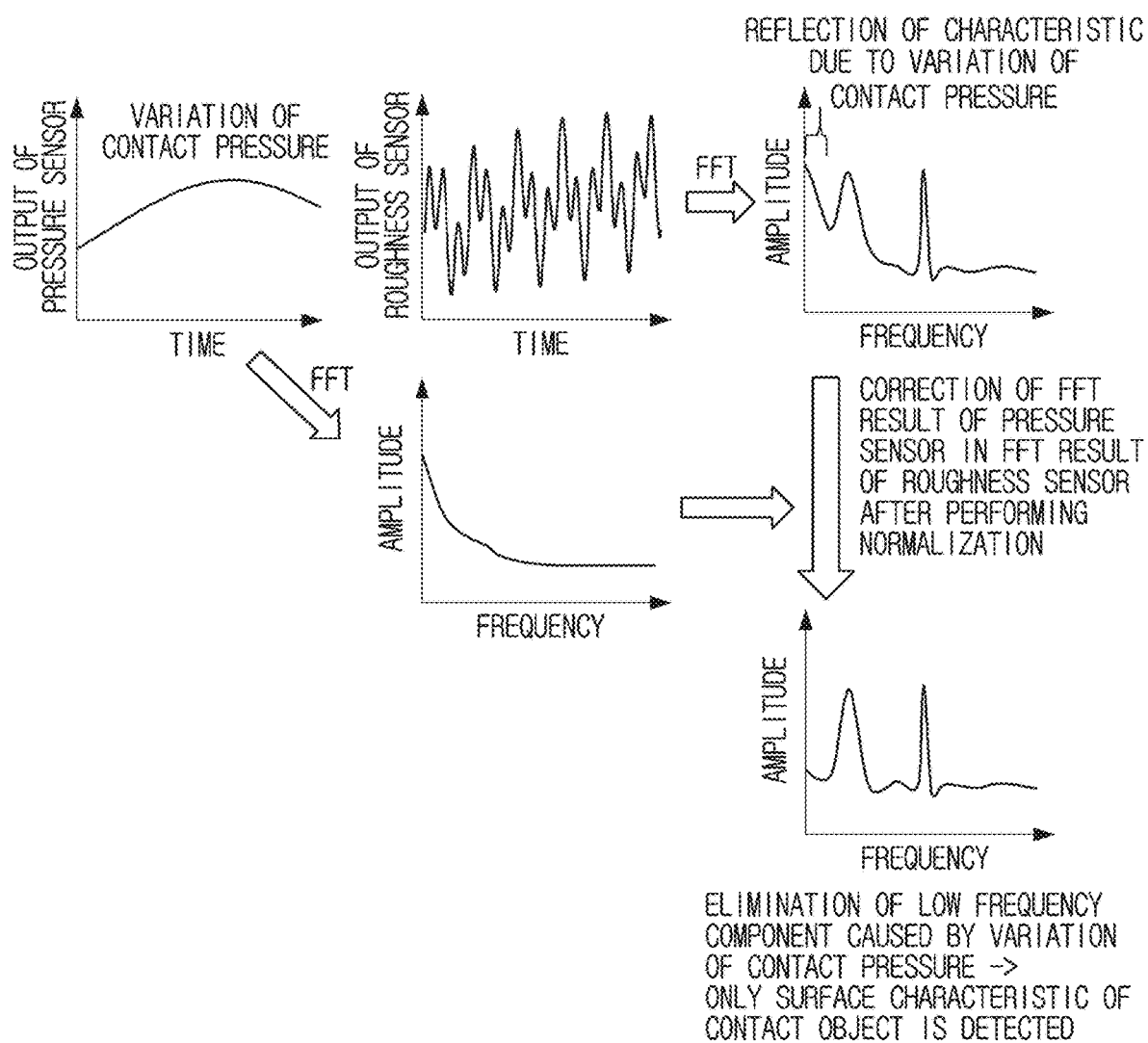
FIG. 7C is a diagram for describing a process of processing a sensed signal in case that the portable surface characteristics measurement device according to an embodiment of the disclosure moves on the surface of the object with a variable pressure.

FIG. 7C is a diagram for describing a process of a signal processing in case that the portable surface characteristics measurement device according to an embodiment of the disclosure moves on the surface of the object with a variable pressure.

As described above, the portable surface characteristics measurement device 100*a* may not include a component for moving the portable surface characteristics measurement device 100*a* at a constant speed with a constant pressure, and may be moved by the user. Therefore, pressure applied to the surface of the object by the portable surface characteristics measurement device 100*a* may vary as the portable surface characteristics measurement device 100*a* moves. However, the pressure may be gently changed. Therefore, when the pressure signal is Fourier-transformed, the Fourier-transformed pressure signal may appear in the low frequency region. However, since the Fourier-transformed pressure signal appears together with the Fourier-transformed vibration signal of the roughness sensor 110, the Fourier-transformed pressure signal may be misidentified as surface roughness information in the low frequency region. Therefore, it is preferable that the pressure component in the low frequency region is eliminated.

The portable surface characteristics measurement device 100*a* may perform Fourier transform on each of the pressure signal of the pressure sensor 140 and the vibration signal of the roughness sensor 110. Further, the portable surface characteristics measurement device 100*a* may eliminate a component of the Fourier-transformed pressure signal from a component of the Fourier-transformed vibration signal. However, since an output magnitude of the component of the vibration signal may be different from that of the component of the pressure signal, and thus a normalization process for the vibration signal and the pressure signal needs to be performed. Therefore, the portable surface characteristics measurement device 100*a* may eliminate the component of the Fourier-transformed pressure signal from the component of the Fourier-transformed vibration signal after performing normalization for the Fourier-transformed pressure signal and the Fourier-transformed vibration signal.

With the above-described process, the portable surface characteristics measurement device 100*a* may accurately identify the surface roughness information of the object regardless of the pressure and the moving speed of the portable surface characteristics measurement device 100*a*.

Meanwhile, as described above, in case that the sampling is performed in consideration of the movement physical quantity by obtaining all the vibration signals during the movement of the portable surface characteristics measurement device, there is a possibility that there is no necessary sampling data. Therefore, the portable surface characteristics measurement device may generate an estimation sampling signal.

Figure 8A:
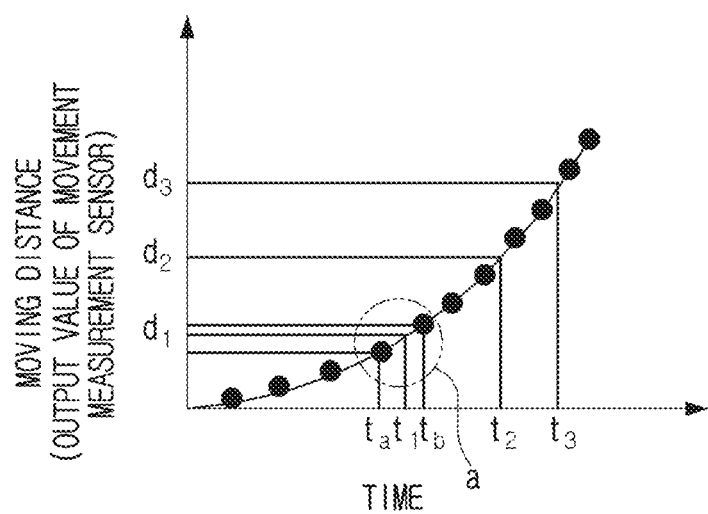
FIG. 8A is a diagram for describing a moving distance in case that the portable surface characteristics measurement device according to an embodiment of the disclosure moves on the surface of the object at a variable speed.
Figure 8B:
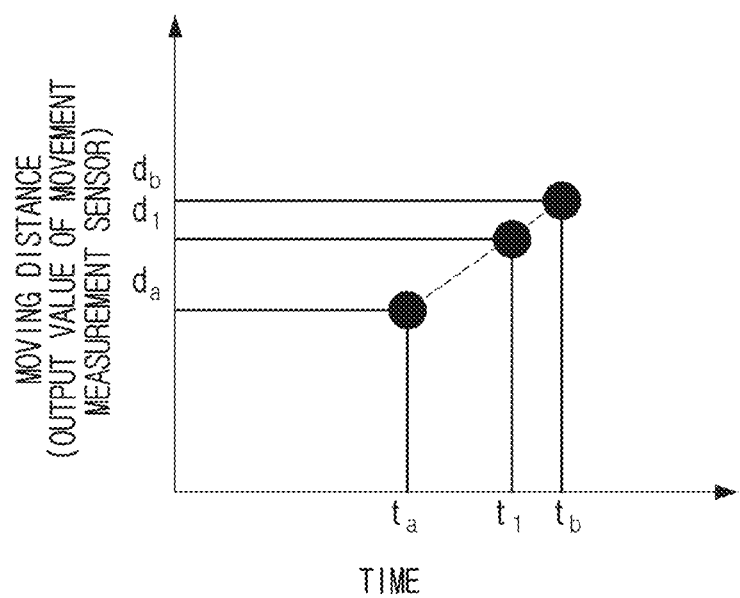
FIG. 8B is a diagram for describing interpolation for the moving distance according to an embodiment of the disclosure.

FIG. 8A is a diagram for describing a moving distance in case that the portable surface characteristics measurement device according to an embodiment of the disclosure moves on the surface of the object at a variable speed, and FIG. 8B is a diagram for describing interpolation for the moving distance according to an embodiment of the disclosure.

As illustrated in FIG. 8A, in case that the portable surface characteristics measurement device is moved by the user, a moving distance per unit time may vary. Points illustrated in FIG. 8A indicate movement information sampled by using a general sampling method, that is, movement information obtained at a constant time interval. In case that the portable surface characteristics measurement device needs to obtain time data ($t_1$, $t_2$, and $t_3$) corresponding to specific moving distances ($d_1$, $d_2$, and $d_3$), the time data being not the constant time interval, there may be no moving distance data measured at time $t_1$.

FIG. 8B is an enlarged view illustrating a region a of FIG. 8A. The portable surface characteristics measurement device may calculate a trend line connecting moving distance values measured at time $t_a$ and time $t_b$ adjacent to the time $t_1$, and estimate moving distance data for the time $t_1$ based on the calculated trend line.

According to an embodiment, since a sampling rate according to the disclosure is sufficiently high, an interval between measured data may be significantly small. Therefore, according to the disclosure, linear interpolation may be used. That is, the portable surface characteristics measurement device may estimate moving distance data for the time $t_1$ according to the following Equation.

$$t_1 = t_a + (d_1 - d_a)\frac{t_b - t_a}{d_b - d_a} \quad \text{[Equation 1]}$$

That is, the portable surface characteristics measurement device may insert an estimation sampling signal between two adjacent sampling signals based on a proportional relationship between the two sampling signals. Specifically, the portable surface characteristics measurement device may generate the estimation sampling vibration signal based on the proportional relationship between the two adjacent sampling vibration signals (that is, by using Equation above), and insert the generated estimation sampling vibration signal between the two adjacent sampling vibration signals.

Figure 9A:
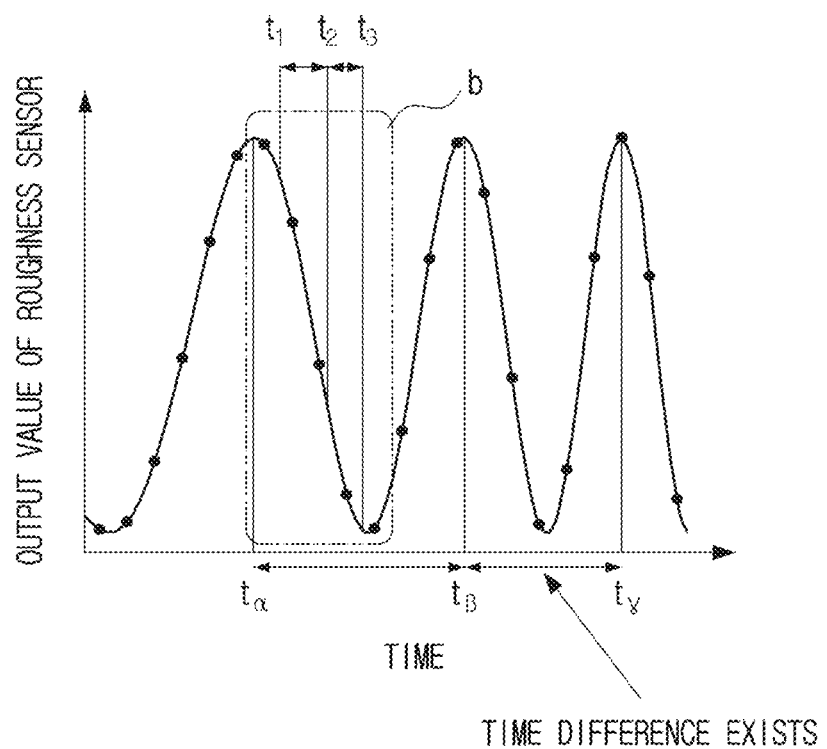
FIG. 9A is a diagram for describing a sensed signal of the portable surface characteristics measurement device according to an embodiment of the disclosure.
Figure 9B:
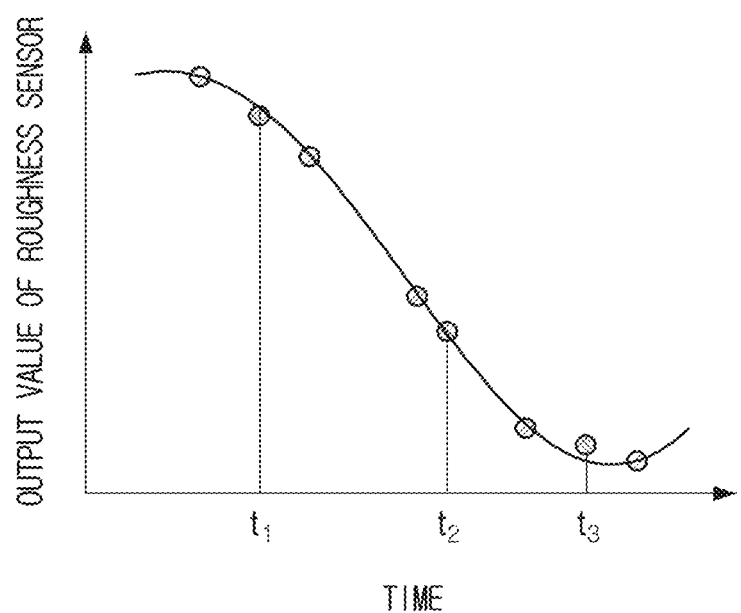
FIG. 9B is a diagram for describing interpolation for the sensed signal according to an embodiment of the disclosure.

FIG. 9A is a diagram for describing a sensed signal of the portable surface characteristics measurement device according to an embodiment of the disclosure, and FIG. 9B is a diagram for describing interpolation for the sensed signal according to an embodiment of the disclosure. Specifically, FIG. 9A illustrates an expectable sensed signal of the portable surface characteristics measurement device of which a moving speed varies (more specifically, a moving speed is increased) due to a contact object with a specific surface period. Points illustrated in FIG. 9A each indicate a roughness signal sampled by using the general sampling method, that is, a roughness signal obtained at a constant time interval. FIG. 9A illustrates a case that the roughness signal has a form of a sine wave, which is only one example for expressing an effect of the disclosure, and the roughness signal may have a form of a square wave, a triangle wave, or a pulse wave according to a form of a surface structure of the contact object and the type of the roughness sensor.

Referring to FIG. 9A, since the moving speed of the portable surface characteristics measurement device varies, an interval between time $t_\alpha$ and time $t_\beta$ and an interval between the time $t_\beta$ and time $t_\gamma$ are different, the time $t_\alpha$, time $t_\beta$, and time $t_\gamma$ each being a time at which a peak of an output of the roughness sensor that may be generated by the contact object with a predetermined surface period is shown. Similarly, an interval between $t_1$ and $t_2$ and an interval between $t_2$ and $t_3$ are also different, $t_1$, $t_2$, and $t_3$ each being a time corresponding to the moving distance $d_1$, $d_2$, or $d_3$ illustrated in FIG. 7A. The portable surface characteristics measurement device needs to sample the vibration signal at the time $t_1$, time $t_2$, and time $t_3$, but there is no vibration signal measured at the respective times. Only one output signal of the roughness sensor with respect to time may present between $t_1$ and $t_2$, but this is only to describe the effect of the disclosure, and more measurement results may be sampled within a time interval corresponding to a unit moving distance.

FIG. 9B is an enlarged view illustrating a region b of FIG. 9A. Similarly to that described above, the portable surface characteristics measurement device may insert an estimation sampling vibration signal between two adjacent sampling vibration signals based on a proportional relationship between the two sampling vibration signals.

According to the disclosure, since an actual sampling rate is sufficiently high, there are no many cases that estimated data need to be inserted.

Figure 10:
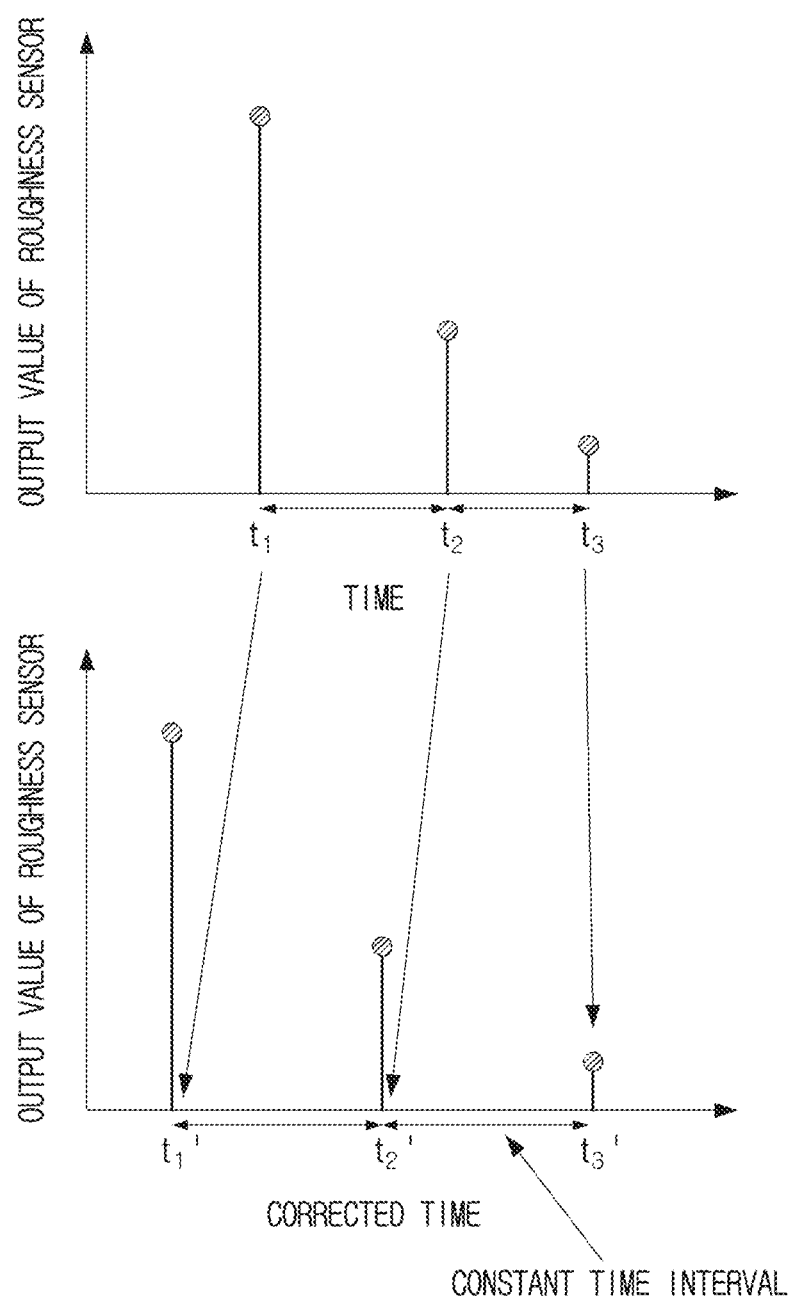
FIG. 10 is a diagram for describing a time correction result according to an embodiment of the disclosure.

FIG. 10 is a diagram for describing a time correction result according to an embodiment of the disclosure.

FIG. 10 illustrates measured vibration signals (or estimated vibration signals) and a result of correction for a constant time interval. Since the speed of the portable surface characteristics measurement device varies, a time interval between the measured vibration signals (or estimated vibration signals) is not constant. For example, since the portable surface characteristics measurement device moves relatively slow between time ti and time $t_2$, the time interval between the measured vibration signals (or estimated vibration signals) is relatively large, and since the portable surface characteristics measurement device moves relatively fast between the time $t_2$ and time $t_3$, the time interval between the measured vibration signals (or estimated vibration signals) is relatively small. However, since moving distances for the time $t_1$, the time $t_2$, and the time $t_3$ each at which the vibration signal (or estimated vibration signal) is measured are the same, the portable surface characteristics measurement device may perform correction on the measured vibration signal (or estimated vibration signal) for a constant interval (for example, 0.001 seconds). For example, the portable surface characteristics measurement device may correct the time interval according to a ratio in case that the speed is higher or lower than a reference speed (for example, 1 cm/s), and the times $t_1$, $t_2$, and $t_3$ each corresponding to a unit moving distance may be corrected to times $t_{1'}$, $t_{2'}$, and $t_{3'}$ each corresponding to the unit moving distance based on the reference speed.

Meanwhile, the vibration signal may also be adjusted in terms of a moving distance change, rather than a speed change.

Figure 11:
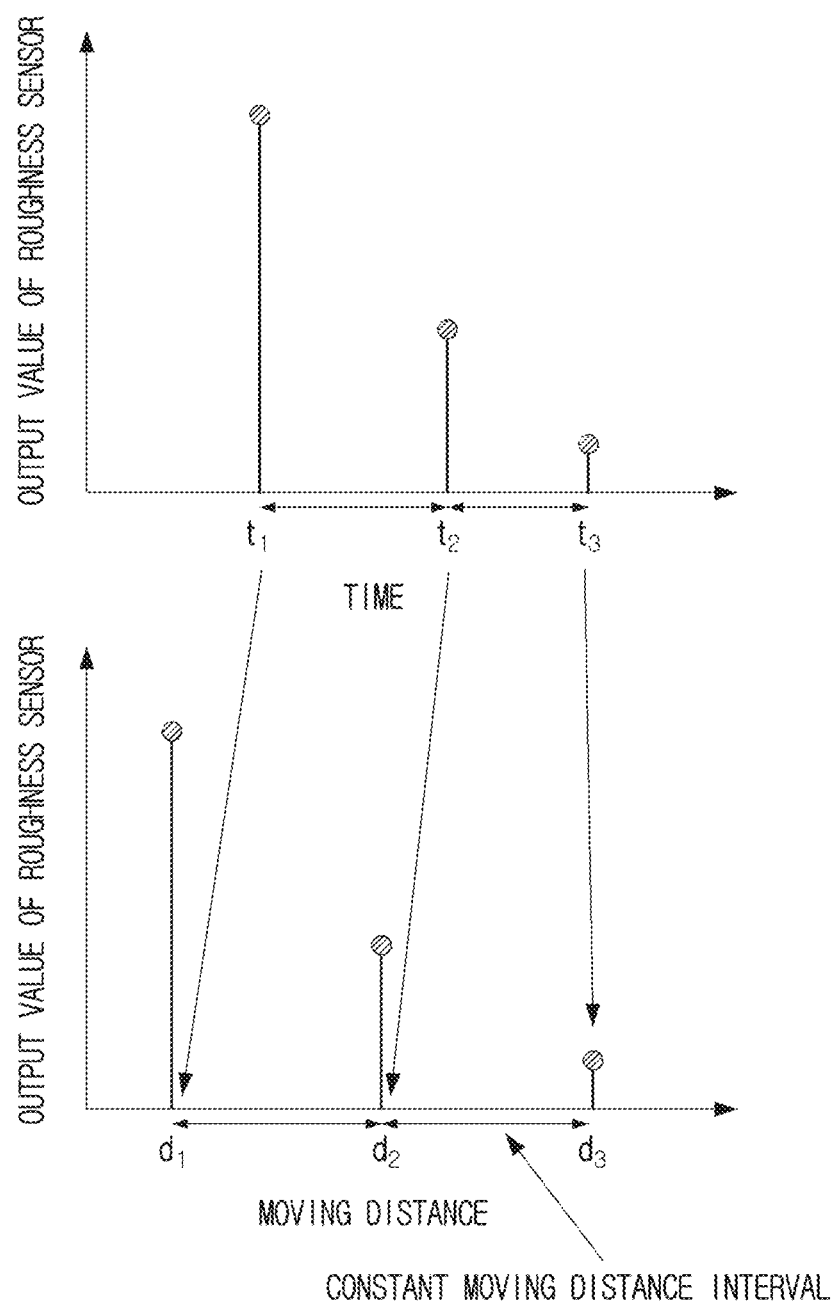
FIG. 11 is a diagram for describing a moving distance correction result according to an embodiment of the disclosure.

FIG. 11 is a diagram for describing a moving distance correction result according to an embodiment of the disclosure.

FIG. 11 illustrates measured vibration signals (or estimated vibration signals) and a result of correction for a constant moving distance interval. Times $t_1$, $t_2$, and $t_3$ are times corresponding to moving distances $d_1$, $d_2$, and $d_3$, respectively, and thus the portable surface characteristics measurement device may obtain a result of correction for a constant moving distance by changing an x axis to a moving distance axis.

Hereinabove, various embodiments of the portable surface characteristics measurement device have been described. Hereinafter, a control method of the portable surface characteristics measurement device will be described.

Figure 12:
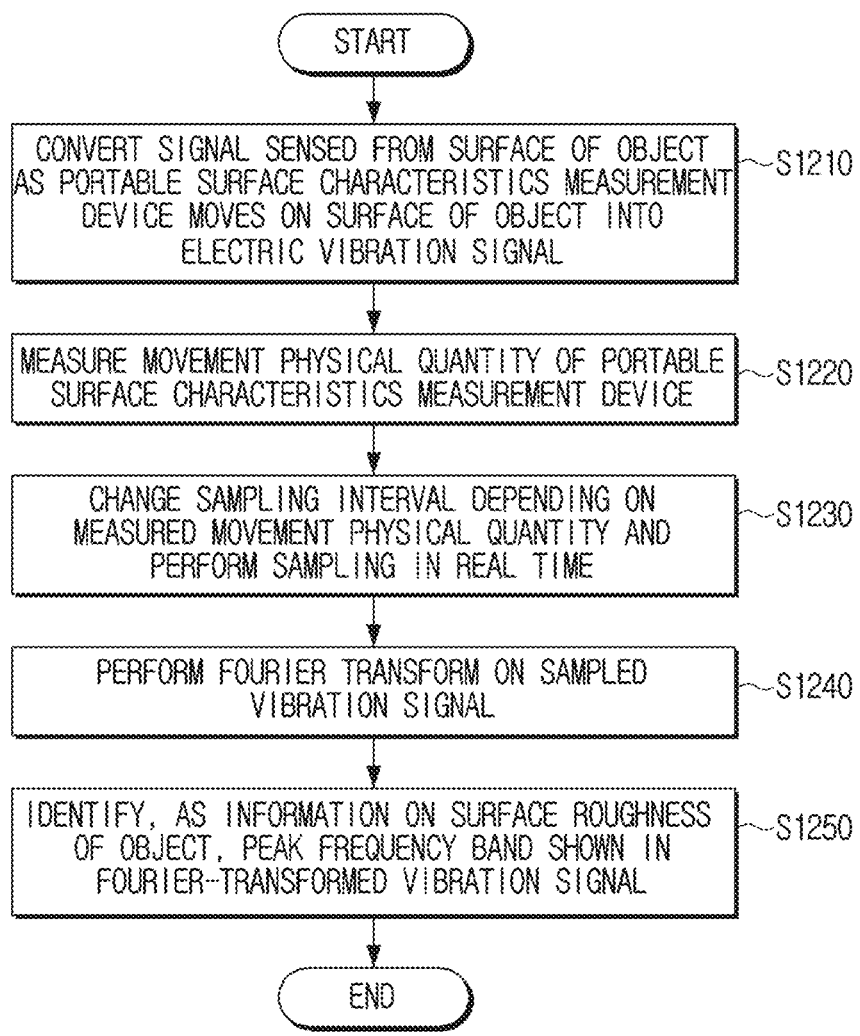
FIG. 12 is a flowchart illustrating a control method of a portable surface characteristics measurement device according to an embodiment of the disclosure.

FIG. 12 is a flowchart illustrating a control method of the portable surface characteristics measurement device according to an embodiment of the disclosure.

Referring to FIG. 12, a signal sensed from a surface of an object during movement of the portable surface characteristics measurement device on the surface of the object may be converted into an electric vibration signal (S1210). The portable surface characteristics measurement device may measure a movement physical quantity of the portable surface characteristics measurement device (S1220). Examples of the movement physical quantity may include a distance, a speed, and acceleration.

The portable surface characteristics measurement device may change a sampling interval depending on the pre-measured movement physical quantity, and sample the vibration signal in real time (S1230). For example, in case that the movement physical quantity is increased, the portable surface characteristics measurement device may decrease the sampling interval, and in case that the movement physical quantity is decreased, the portable surface characteristics measurement device may increase the sampling interval, thereby sampling the vibration signal at a constant predetermined interval.

In case that the movement physical quantity is acceleration, the portable surface characteristics measurement device may integrate the measured acceleration, and sample the vibration signal based on the integrated acceleration. Alternatively, in case that the movement physical quantity is a speed, the portable surface characteristics measurement device may integrate the measured speed, and sample the vibration signal based on the integrated speed.

Meanwhile, the portable surface characteristics measurement device may transmit, to the roughness sensor, an interrupt signal according to the changed sampling interval based on the measured movement physical quantity. Further, the roughness sensor may transfer the vibration signal to the processor based on the transmitted interrupt signal, and the processor may sample the received vibration signal.

The portable surface characteristics measurement device may perform Fourier transform on the sampled vibration signal (S1240). The portable surface characteristics measurement device may identify, as surface roughness information of the object, a peak frequency band shown in the Fourier-transformed vibration signal (S1250).

Meanwhile, the portable surface characteristics measurement device may further include the pressure sensor to sense pressure applied to the surface of the object and convert the sensed pressure into an electric pressure signal. Further, the portable surface characteristics measurement device may sample the pressure signal at the same interval as the sampling interval of the vibration signal. The portable surface characteristics measurement device may perform Fourier transform on the sampled pressure signal.

The portable surface characteristics measurement device may perform normalization for the Fourier-transformed vibration signal and the Fourier-transformed pressure signal. Further, the portable surface characteristics measurement device may eliminate a component of the normalized pressure signal from the normalized vibration signal. The portable surface characteristics measurement device may identify, as surface roughness information of the object, a peak frequency band shown in the normalized vibration signal from which the component of the normalized pressure signal is eliminated.

Meanwhile, the vibration signal sensed by the portable surface characteristics measurement device may be converted into information on a quantitative value of expected human tactile perception.

Figure 13:
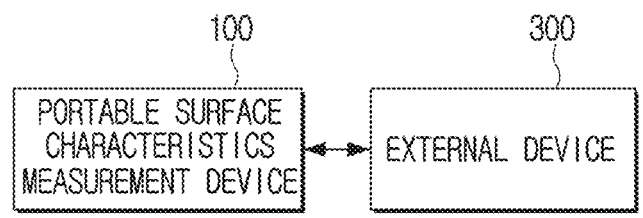
FIG. 13 is a diagram for describing a surface characteristics measurement system according to an embodiment of the disclosure.
Figure 14:
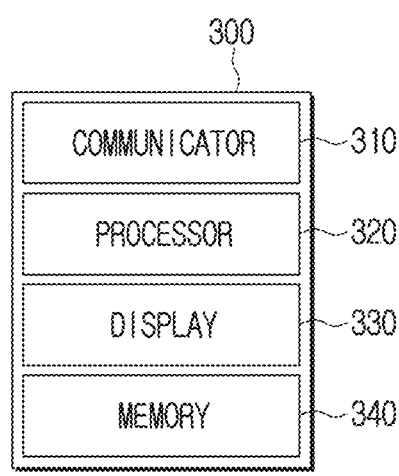
FIG. 14 is a block diagram of a device included in the surface characteristics measurement system according to an embodiment of the disclosure.

FIG. 13 is a diagram for describing a surface characteristics measurement system according to an embodiment of the disclosure, and FIG. 14 is a block diagram of a device included in the surface characteristics measurement system according to an embodiment of the disclosure. The following description will be provided with reference to FIGS. 13 and 14.

A surface characteristics measurement device according to the related art may present a physical quantity (for example, a surface period or Ra) of a surface characteristic related to roughness of a contact object, but it is difficult for a general user who is not a measurement specialist to intuitively perceive such a physical quantity. For example, when a user purchases clothes, tactile perception related to surface roughness of the clothes is a very important factor. However, even in case that a physical quantity of the surface roughness of the clothes is presented in an on-line shopping mall or the like, it is difficult for the general user to intuitively understand tactile perception of the clothes. Meanwhile, a physical quantity of surface roughness of clothes may help the general user to intuitively perceive a difference between two or more products. Therefore, in case that the surface characteristics measurement system provides both quantitative information for product comparison and a word that may be intuitively understood by the user, the user may intuitively and easily perceive product roughness information. Referring to FIG. 13, the surface characteristics measurement system may include the portable surface characteristics measurement device 100 and an external device 300. Further, referring to FIG. 14, the external device 300 may include a communicator 310, a processor 320, a display 330, and a memory 340.

As described above, the portable surface characteristics measurement device 100 may sense a signal corresponding to roughness of a surface of an object during movement on the surface of the object. The portable surface characteristics measurement device 100 may convert the sensed signal into an electric vibration signal. At the same time, the portable surface characteristics measurement device 100 may measure a movement physical quantity. Examples of the movement physical quantity may include a moving distance, a moving speed, and acceleration of the portable surface characteristics measurement device 100. The portable surface characteristics measurement device 100 may repeatedly sense a signal for multiple objects with different roughness.

The portable surface characteristics measurement device 100 may change a sampling interval depending on the measured movement physical quantity, and sample a vibration signal in real time. The portable surface characteristics measurement device 100 may perform Fourier transform on the sampled vibration signal and extract surface roughness feature information from the Fourier-transformed vibration signal. Meanwhile, the portable surface characteristics measurement device 100 may further perform a process of correcting an error of information on the above-described contact pressure, a zero padding process, and a noise canceling process.

Examples of the surface roughness feature information extracted by the portable surface characteristics measurement device 100 may include a peak average (PA), power (P), a spectral centroid (SC), skewness (Sk), kurtosis (K), and energy in a specific surface period section. In addition, standard deviation (SD), Ra, or the like may be also used for a sensor output signal with respect to time before performing the Fourier transform and the zero padding. The above-described feature information may be derived by the following Equations.

$$PA = \frac{1}{N}\sum_{n=0}^{N} X(\lambda_n) \quad \text{[Equation 2]}$$

$$P = \frac{1}{N}\sum_{n=0}^{N} X(\lambda_n)^2 \quad \text{[Equation 3]}$$

$$SC = \frac{\sum_{n=0}^{N} \lambda_n \cdot X(\lambda_n)^2}{\sum_{n=0}^{N} X(\lambda_n)^2} \quad \text{[Equation 4]}$$

$$S_k = \frac{N}{(N-1)(N-2)}\sum_{n=1}^{N}\left(\frac{X(\lambda_n) - \overline{X(\lambda)}}{\sigma}\right)^3 \quad \text{[Equation 5]}$$

$$K = \left\{\frac{N(N+1)}{(N-1)(N-2)(N-3)}\sum_{n=1}^{N}\left(\frac{X(\lambda_n) - \overline{X(\lambda)}}{\sigma}\right)^4\right\} - 3\frac{(N-1)^2}{(N-2)(N-3)} \quad \text{[Equation 6]}$$

$$SD = \sqrt{\sum_{i=1}^{n}\frac{(y_i - \overline{y})^2}{n-1}} \quad \text{[Equation 7]}$$

$$Ra = \frac{1}{n}\sum_{i=1}^{n}|y_i - \overline{y}| \quad \text{[Equation 8]}$$

$X(\lambda n)$ is a surface period, which is an amplitude Fourier-transformed into the frequency domain, and yi is an amplitude of a vibration signal in the time domain. − represents an average value, and σ represents a standard deviation.

The portable surface characteristics measurement device 100 may transmit the extracted surface roughness feature information to the communicator 310 of the external device 300. The communicator 310 of the external device 300 may receive the surface roughness feature information from the portable surface characteristics measurement device 100, obtain material information of the object, and obtain texture lexicon information based on tactile survey. Further, the processor 320 of the external device 300 may identify quantitative tactile perception value information based on the tactile survey result and the received surface roughness feature information. Meanwhile, the external device 300 may further include an inputter (not illustrated) and receive the material information, or the tactile survey result including the tactile perception survey information, or the texture lexicon survey information through the inputter.

The memory 340 of the external device 300 may store the surface roughness feature information, the tactile perception value information, the material information, and the texture lexicon information in association with one another. In case that the communicator 310 of the external device 300 receives surface roughness feature information of an arbitrary object from the portable surface characteristics measurement device, the processor 320 may identify tactile perception value information, material information, and texture lexicon information of the arbitrary object. Further, the processor 320 of the external device 300 may control the display 330 to output the identified tactile perception value information, material information, and texture lexicon information.

For example, the external device 300 may be a terminal device or a server. Alternatively, the external device 300 may include both a terminal device and a server. In case that the external device 300 includes both of a terminal device and a server, the terminal device may obtain material information of an object, and tactile survey result related to the object from a user. The terminal device may transmit, to the server, the material information of the object, and the tactile survey result related to the object that are obtained, and the server may obtain texture lexicon information based on the tactile survey result related to the object. Further, the server may obtain tactile perception value information based on the surface roughness feature information and the tactile survey result. The server may store the surface roughness feature information, the tactile perception value information, the material information, and the texture lexicon information in association with one another, and identify tactile pereception value information, material information, and texture lexicon information that are associated with surface roughness feature information of an arbitrary object based on received surface roughness feature information of the arbitrary object. The server may output the identified tactile perception value information, material information, and texture lexicon information. Alternatively, the server may transmit the identified tactile perception value information, material information, and texture lexicon information to the terminal device, and the terminal device may output the received tactile perception value information, material information, and texture lexicon information.

Examples of the surface roughness feature information may include a peak average (PA), power (P), a spectral centroid (SC), skewness (Sk), kurtosis (K), and energy in a specific surface period section. The material information may be information on an object such as a rough wood, a rubber, a polished metal plate, or a sandpaper. The tactile perception value information may be an average score of a magnitude of a perceived stimulus for a specific tactile impression, obtained by a psychological tactile survey to be described later. Further, the texture lexicon information may be interpreted to be different depending on a definition thereof, and thus the texture lexicon information is defined by being divided into a sensation word and an emotion word. The sensation word may be a word related to a magnitude of sensation such as smooth, moderate, or rough, which qualitatively expresses a magnitude of a perceived stimulus for a specific tactile impression. Here, the magnitude of the perceived stimulus may be expressed in more detail by adding an adverb such as "very" or "slightly" (for example, "very smooth", "smooth", "slightly smooth", "moderate", "slightly rough", "rough", or "very rough"). Unlike the sensation word, the emotion word may be a word which is a complex expression combined with other feelings, rather than a word exclusive to a specific feeling. Examples of the emotion word may include "gentle", "luxurious", "hard and lumpy", and "light".

Figure 15:
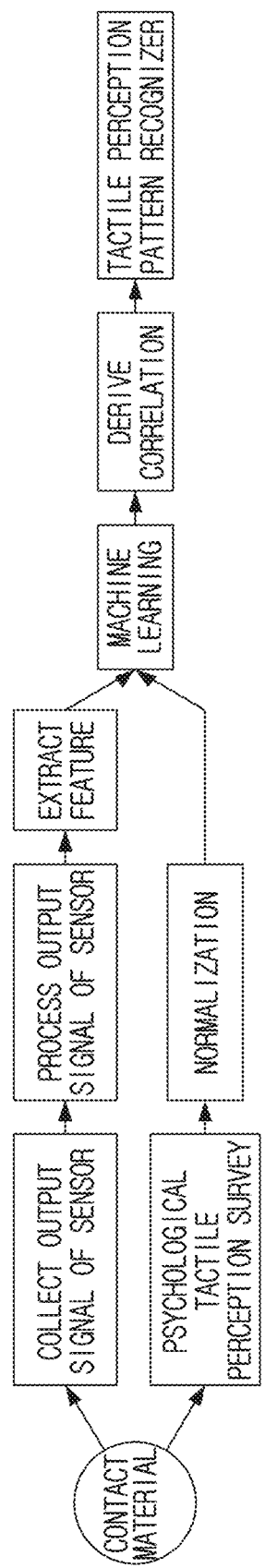
FIG. 15 is a diagram for describing an example of a process of obtaining information on a quantitative value of tactile impression perceived by a human.

FIG. 15 is a diagram for describing an example of a process of obtaining information on a quantitative value of human tactile perception. Referring to FIG. 15, a sensor of the portable surface characteristics measurement device may collect a surface roughness signal. Further, the portable surface characteristics measurement device may process the sensed signal by performing the above-described processes such as Fourier transform, variable sampling, zero padding, and noise canceling. The portable surface characteristics measurement device may extract the surface roughness feature information by processing the sensed signal.

Meanwhile, the external device may obtain psychological tactile perception survey information and perform normalization of the obtained tactile perception survey information. The external device may receive the extracted surface roughness feature information from the portable surface characteristics measurement device and machine-learns the surface roughness feature information and the tactile perception survey information. Examples of the machine-learning may include methods such as deep neural network and regression. The external device that has performed the machine-learning may obtain a correlation between the surface roughness feature information and the tactile perception survey information. The external device that has performed the machine-learning may output the tactile perception value information, material information, and texture lexicon information identified based on the surface roughness feature information. The tactile perception value information may be a quantitative value of roughness that may be perceived by the user from the surface roughness feature information. The material information may be information on a target object. Further, the texture lexicon information may be word information expressing the quantitative value of roughness described above, and an emotion word. Big data about various materials may also be collected to improve accuracy of the machine-learning.

Figure 16:
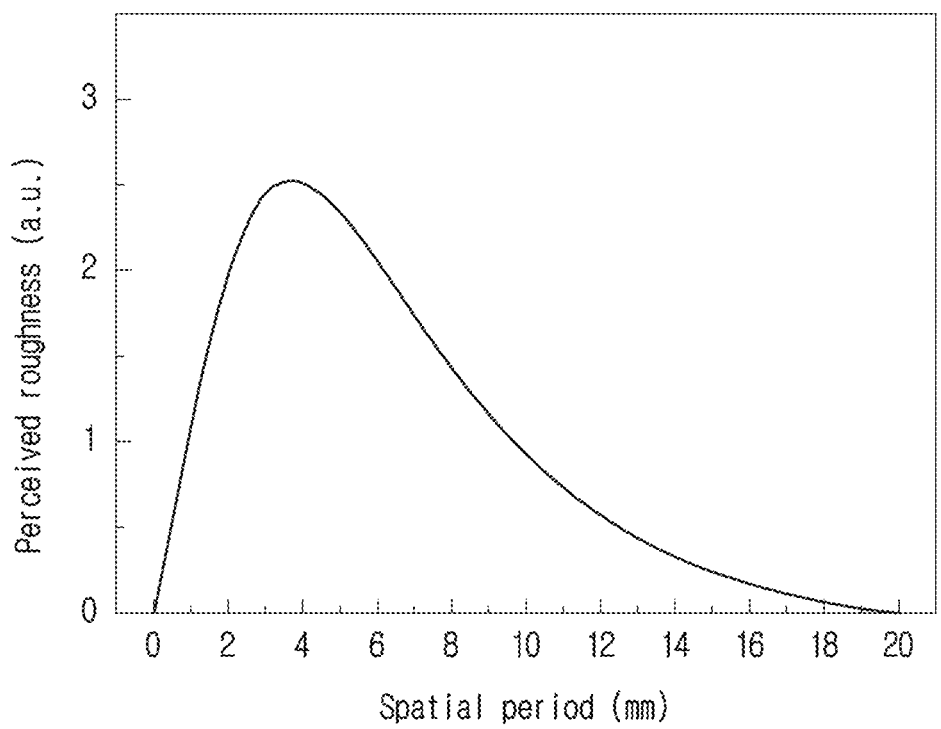
FIG. 16 is a diagram illustrating an example in which human roughness perception dependent surface period is modeled.

FIG. 16 is a diagram illustrating an example in which a human roughness perception dependent surface period is modeled, and FIG. 17 is a diagram for describing an example of a tactile survey form. The following description will be provided with reference to FIGS. 16 and 17.

It is known that a human may perceive roughness of about tens of nm. Further, it is known that a value of roughness perceived by a human is largest when a surface period is about 3 to 4 mm, and the value of roughness perceived by a human is decreased when the surface period is smaller or larger. A biomimetic feature extraction method reflecting such a fact may be applied. FIG. 16 illustrates an example in which a human roughness perception dependent surface period is modeled.

A biomimetic feature (BF) may be extracted by applying a modeling function illustrated in FIG. 16 as a weight value for each surface period as shown in Equation 9.

$$BF = \sum_{n=1}^{N}(\lambda_n - \lambda_{n-1}) \cdot X(\lambda_n) \cdot U(\lambda_n) \qquad \text{[Equation 9]}$$

$U(\lambda)$ represents a function obtained by modeling roughness perceived by a human with respect to a surface period. The external device may collect psychological tactile survey information to output the surface roughness feature information extracted by the portable surface characteristics measurement device, as human tactile perception information, and textile lexicon information. The psychological tactile survey may be performed for the same material as that of the object subjected to the surface measurement performed by the portable surface characteristics measurement device.

FIG. 17 illustrates an example of a psychological tactile survey form. As the psychological tactile survey, a quantitative tactile perception survey and a qualitative tactile lexicon survey in which a word expressing tactile perception is surveyed may be performed together. The quantitative tactile perception survey may be performed by a scoring method, and standard samples for the lowest score and the highest score may be presented. As an example, a polished metal plate may be presented for the lowest score, and a sandpaper may be presented for the highest score. A standard sample for the middle score (4 in FIG. 17) may be additionally presented to facilitate the quantitative tactile perception survey. In the example illustrated in FIG. 17, the score is set to seven points, which is only an example. The score of the quantitative tactile perception survey may be variously set.

In the qualitative tactile perception survey, a sensation word and an emotion word that those questioned may most appropriately express tactile impression of the material. As an example, the qualitative tactile perception survey may be performed by presenting seven expressions as illustrated in FIG. 17 as the sensation words. In case that the standard samples for the lowest score and the highest score are not presented, scoring of subjective judgment of those questioned, and the external device may perform a process of performing normalization of a difference in tactile perception between those questioned. As the sensation word, more detailed expressions than the seven expressions illustrated in FIG. 17 may be presented. As an example, the emotion word may be selected from an emotion word table illustrated in FIG. 17.

Hereinabove, various embodiments of the surface characteristics measurement system have been described. In the embodiments of the surface characteristics measurement system described above, only the roughness feature has been described. However, the surface characteristics measurement system may also be applied to other tactile sense such as hardness, stiffness, and warmth. In order for the surface characteristics measurement system identifies other tactile sense, the portable surface characteristics measurement device may include a sensor such as a pressure sensor, a shear force sensor, a temperature sensor, or a heater, and a tactile survey on hardness, stiffness, or warmth may also be performed similarly to that described above.

That is, the portable surface characteristics measurement device may further include a communicator and transmit information to the external device. As an example, the communicator may include a wireless communication module such as a wireless fidelity (Wi-Fi) module or a Bluetooth module, or a wired communication module. Meanwhile, as described above, the external device may be implemented by a terminal device or a server, or may be implemented by two devices including a terminal device and a server. The external device may be implemented by two devices including a terminal device and a server, and the terminal device may be a portable terminal device. In case that the terminal device is a portable terminal device, the portable terminal device may include an application related to surface characteristics measurement. The application related to surface characteristics measurement may perform a function of operating the portable surface characteristics measurement device, a function of transferring a signal sensed by the portable surface characteristics measurement device to the server, and a function of receiving information processed by the server and outputting the information. Here, the portable surface characteristics measurement device may transmit the sensed signal to the server through the portable terminal device, and the server may process and store the sensed signal received from the portable terminal device. The server may extract surface roughness feature information from the sensed signal, and identify quantitative tactile perception value information based on the extracted surface roughness feature information. Further, the server may identify texture lexicon information based on a tactile survey result, and obtain material information directly or through the portable terminal device. The server may store the quantitative tactile perception value information, the material information, and the texture lexicon information in association with the surface roughness feature information. Further, once surface roughness feature information of another object is received, the server may compare the received surface roughness feature information with the stored surface roughness feature information, and may identify and output quantitative tactile perception value information, material information, and texture lexicon information associated with surface roughness feature information that coincides with or is similar to the received surface roughness feature information. Hereinabove, a case that the portable surface characteristics measurement device or the server extracts the surface roughness feature information from the sensed signal has been described. However, the portable terminal device may extract the surface roughness feature information from the sensed signal in some cases.

The control method of the portable surface characteristics measurement device according to various embodiments described above may be provided in a form of a computer program product. The computer program product may include a software (S/W) program or a non-transitory computer readable medium in which a S/W program is stored.

The non-transitory computer readable medium means a medium that semi-permanently stores data and is readable by a device, not a medium that stores data for a short period of time such as a register, a cache, a memory, or the like. Specifically, the above-described various applications or programs may be provided in a state of being stored in a non-transitory computer readable medium such as a compact disk (CD), a digital versatile disk (DVD), a hard disk, a Blu-ray disk, a universal serial bus (USB), a memory card, or a read only memory (ROM).

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A portable surface characteristics measurement device comprising:
   a roughness sensor configured to convert a signal sensed from a surface of an object during movement of the portable surface characteristics measurement device on the surface of the object into an electric vibration signal;

a movement measurement sensor configured to measure a movement physical quantity of the portable surface characteristics measurement device; and a processor configured to change a sampling interval depending on the measured movement physical quantity, and sample the vibration signal in real time, wherein the processor is configured to perform Fourier transform on the sampled vibration signal, and identify a peak frequency band shown in the Fourier-transformed vibration signal as surface roughness information of the object.

2. The portable surface characteristics measurement device as claimed in claim 1, wherein the processor is configured to decrease the sampling interval in case that the movement physical quantity is increased, and increase the sampling interval in case that the movement physical quantity is decreased, to sample the vibration signal at a constant predetermined interval.

3. The portable surface characteristics measurement device as claimed in claim 1, wherein the movement physical quantity is at least one of a distance, a speed, or acceleration.

4. The portable surface characteristics measurement device as claimed in claim 3, wherein the processor is configured to integrate, in case that the movement physical quantity is the acceleration, the measured acceleration, and sample the vibration signal based on the integrated acceleration.

5. The portable surface characteristics measurement device as claimed in claim 1, wherein the processor is configured to transmit, to the roughness sensor, an interrupt signal according to the changed sampling interval based on the measured movement physical quantity, and sample the received vibration signal based on the transmitted interrupt signal.

6. The portable surface characteristics measurement device as claimed in claim 1, further comprising a pressure sensor configured to sense pressure applied to the surface of the object and convert the sensed pressure into an electric pressure signal, wherein the processor is configured to sample the pressure signal at the same interval as the sampling interval of the vibration signal, perform Fourier transform on the sampled pressure signal, perform normalization of the Fourier-transformed vibration signal and the Fourier-transformed pressure signal, eliminate a component of the normalized pressure signal from the normalized vibration signal, and identify a peak frequency band shown in the normalized vibration signal from which the component of the normalized pressure signal is eliminated, as the surface roughness information of the object.

7. A portable surface characteristics measurement device comprising:

a roughness sensor configured to convert signals sensed from a surface of an object during movement of the portable surface characteristics measurement device on the surface of the object into electric vibration signals;

a movement measurement sensor configured to measure a movement physical quantity of the portable surface characteristics measurement device; and a processor configured to change a sampling interval depending on the measured movement physical quantity, and sample some of the vibration signals, wherein the processor is configured to perform Fourier transform on the sampled some vibration signals, and identify peak frequency bands shown in the Fourier-transformed some vibration signals as surface roughness information of the object.

8. The portable surface characteristics measurement device as claimed in claim 7, wherein the processor is configured to decrease the sampling interval in case that the movement physical quantity is increased, and increase the sampling interval in case that the movement physical quantity is decreased, to sample the vibration signal at a constant predetermined interval.

9. The portable surface characteristics measurement device as claimed in claim 7, wherein the processor is configured to insert an estimated sampling vibration signal between two adjacent sampling vibration signals and perform sampling.

10. The portable surface characteristics measurement device as claimed in claim 9, wherein the processor is configured to generate the estimated sampling vibration signal based on a proportional relationship between the two adjacent sampling vibration signals, insert the generated estimated sampling vibration signal between the two adjacent sampling vibration signals, and perform sampling.

11. The portable surface characteristics measurement device as claimed in claim 7, further comprising a pressure sensor configured to sense pressure applied to the surface of the object and convert the sensed pressure into electric pressure signals, wherein the processor is configured to sample some of the pressure signals at the same interval as the sampling interval of the some vibration signal, perform Fourier transform on the sampled some pressure signals, perform normalization of the Fourier-transformed some vibration signals and the Fourier-transformed some pressure signals, eliminate components of the normalized some pressure signals from the normalized some vibration signals, and identify peak frequency bands shown in the normalized some vibration signals from which the components of the normalized some pressure signals are eliminated, as the surface roughness information of the object.

12. A control method of a portable surface characteristics measurement device, the control method comprising:

converting a signal sensed from a surface of an object during movement of the portable surface characteristics measurement device on the surface of the object into an electric vibration signal;

measuring a movement physical quantity of the portable surface characteristics measurement device;

changing a sampling interval depending on the measured movement physical quantity, and sampling the vibration signal in real time;

performing Fourier transform on the sampled vibration signal; and identifying a peak frequency band shown in the Fourier-transformed vibration signal as surface roughness information of the object.

13. The control method as claimed in claim 12, wherein in the sampling, the sampling interval is decreased in case that the movement physical quantity is increased, and the sampling interval is increased in case that the movement physical quantity is decreased, to sample the vibration signal at a constant predetermined interval.

14. The control method as claimed in claim 12, wherein the movement physical quantity is at least one of a distance, a speed, or acceleration.

15. The control method as claimed in claim 14, wherein in the sampling, in case that the movement physical quantity is the acceleration, the measured acceleration is integrated, and the vibration signal is sampled based on the integrated acceleration.

16. The control method as claimed in claim 12, wherein in the sampling, an interrupt signal is transmitted to a roughness sensor according to the changed sampling interval based on the measured movement physical quantity, and the received vibration signal is sampled based on the transmitted interrupt signal.

17. The control method as claimed in claim 12, further comprising:
    sensing pressure applied to the surface of the object and converting the sensed pressure into an electric pressure signal;
    sampling the pressure signal at the same interval as the sampling interval of the vibration signal; and
    performing Fourier transform on the sampled pressure signal,
    wherein in the identifying, normalization of the Fourier-transformed vibration signal and the Fourier-transformed pressure signal is performed, a component of the normalized pressure signal is eliminated from the normalized vibration signal, and a peak frequency band shown in the normalized vibration signal from which the component of the normalized pressure signal is eliminated is identified as the surface roughness information of the object.

18. A surface characteristics measurement system comprising:
    a portable surface characteristics measurement device configured to convert a signal sensed from a surface of an object during movement of the portable surface characteristics measurement device on the surface of the object into an electric vibration signal, measure a movement physical quantity of the portable surface characteristics measurement device, change a sampling interval depending on the measured movement physical quantity and sample the vibration signal in real time, perform Fourier transform on the sampled vibration signal, extract surface roughness feature information from the Fourier-transformed vibration signal, and transmit the extracted surface roughness feature information to an external device; and
    the external device configured to obtain material information of the object, obtain texture lexicon information based on tactile survey result related to the object, and identify quantitative tactile perception value information based on the transmitted surface roughness feature information and the tactile survey result.

19. The surface characteristics measurement system as claimed in claim 18, wherein the external device stores the surface roughness feature information, the tactile perception value information, the material information, and the texture lexicon information in association with one another, receives surface roughness feature information of a second object obtained from a surface of the second object through the portable surface characteristics measurement device, and identifies tactile perception value information, material information, and texture lexicon information associated with the received surface roughness feature information of the second object.

20. The surface characteristics measurement system as claimed in claim 19, wherein the external device outputs the identified tactile perception value information, material information, and texture lexicon information.

* * * * *